US007849185B1

(12) United States Patent  
Rockwood

(10) Patent No.: US 7,849,185 B1
(45) Date of Patent: *Dec. 7, 2010

(54) SYSTEM AND METHOD FOR ATTACKER ATTRIBUTION IN A NETWORK SECURITY SYSTEM

(75) Inventor: Troy Dean Rockwood, Thousand Oaks, CA (US)

(73) Assignee: Raytheon Company, Waltham, MA (US)

(*) Notice: Subject to any disclaimer, the term of this patent is extended or adjusted under 35 U.S.C. 154(b) by 955 days.

This patent is subject to a terminal disclaimer.

(21) Appl. No.: 11/328,689

(22) Filed: Jan. 10, 2006

(51) Int. Cl.
  *G06F 15/173* (2006.01)
  *G06F 17/30* (2006.01)
(52) U.S. Cl. .................... 709/224; 707/717; 707/725
(58) Field of Classification Search ................. 709/224
  See application file for complete search history.

(56) References Cited

U.S. PATENT DOCUMENTS

| | | | |
|---|---|---|---|
| 5,020,411 A | 6/1991 | Rowan | 89/1.11 |
| 5,341,229 A | 8/1994 | Rowan | 359/10 |
| 5,432,871 A | 7/1995 | Novik | 382/232 |
| 5,790,599 A | 8/1998 | Wright, Jr. et al. | |
| 5,805,801 A | 9/1998 | Holloway et al. | 395/187.01 |
| 5,991,881 A | 11/1999 | Conklin et al. | 713/201 |
| 6,088,804 A | 7/2000 | Hill et al. | |
| 6,226,589 B1 | 5/2001 | Maeda et al. | 701/207 |
| 6,253,337 B1 | 6/2001 | Maloney et al. | 714/38 |
| 6,327,550 B1 | 12/2001 | Vinberg et al. | 702/186 |
| 6,341,298 B1 | 1/2002 | Ilani | |
| 6,347,263 B1 | 2/2002 | Johnson et al. | 701/14 |
| 6,404,380 B2 | 6/2002 | Poore, Jr. | 342/96 |
| 6,408,297 B1 | 6/2002 | Ohashi | 707/10 |
| 6,421,467 B1 | 7/2002 | Mitra | |
| 6,574,378 B1 | 6/2003 | Lim | |
| 6,633,882 B1 | 10/2003 | Fayyad et al. | |
| 6,650,779 B2 | 11/2003 | Vachtesvanos et al. | |
| 6,665,715 B1 | 12/2003 | Houri | 709/223 |
| 6,674,911 B1 | 1/2004 | Pearlman et al. | |

(Continued)

OTHER PUBLICATIONS

"Incremental Maintenance of Nested Relational Views". Jixue Liu; Vincent, Millist; Mohania, Mukesh. Database Engineering and Applications, 1999. IDEAS '99. International Symposium Proceedings. Aug. 2-4, 1999. pp. 197-205. Digital Object Identifier 10.1109/IDEAS.1999.787268.*

(Continued)

*Primary Examiner*—Ashok B Patel
*Assistant Examiner*—Kevin Bechtel
(74) *Attorney, Agent, or Firm*—Baker Botts L.L.P.

(57) ABSTRACT

A method for correlating event information comprises receiving a query associated with an attribute value of a detected event. The method continues by identifying a rule for determining the attribute value, the rule associated with a rule identifier. The method continues by identifying in a first table a rule update time associated with the rule. The method continues by determining attribute values for a plurality of detected events stored in a second table, wherein the plurality of detected events occurred after the rule update time and are associated with event identifiers. The method continues by storing in a third table the determined attribute values and the event identifiers. The method concludes by identifying in the third table one or more event identifiers associated with one or more attribute values that satisfy the query.

21 Claims, 10 Drawing Sheets

U.S. PATENT DOCUMENTS

| | | | | |
|---|---|---|---|---|
| 6,744,396 | B2 | 6/2004 | Stone et al. | 342/36 |
| 6,954,775 | B1 | 10/2005 | Shanklin et al. | 709/105 |
| 7,017,186 | B2 | 3/2006 | Day | |
| 7,058,976 | B1 | 6/2006 | Dark | 726/23 |
| 7,100,204 | B1 | 8/2006 | Myllymaki et al. | |
| 7,127,743 | B1 | 10/2006 | Khanolkar et al. | 726/23 |
| 7,130,611 | B2 | 10/2006 | Kimura et al. | 455/404.2 |
| 7,146,421 | B2 | 12/2006 | Syvanne | 709/226 |
| 7,185,368 | B2 | 2/2007 | Copeland, III | 726/25 |
| 7,251,376 | B2 | 7/2007 | Qian et al. | |
| 7,293,238 | B1 | 11/2007 | Brook | |
| 7,324,108 | B2 | 1/2008 | Hild et al. | 345/440 |
| 7,352,280 | B1 | 4/2008 | Rockwood | |
| 7,370,358 | B2 | 5/2008 | Ghanea-Hercock | 726/23 |
| 2002/0059164 | A1* | 5/2002 | Shtivelman | 707/1 |
| 2002/0078381 | A1 | 6/2002 | Farley et al. | 713/201 |
| 2002/0112189 | A1 | 8/2002 | Syvanne et al. | 713/201 |
| 2002/0165842 | A1 | 11/2002 | Hellerstein et al. | 706/47 |
| 2003/0009699 | A1 | 1/2003 | Gupta et al. | 713/201 |
| 2003/0023876 | A1 | 1/2003 | Bardsley et al. | 713/201 |
| 2003/0058339 | A1 | 3/2003 | Trajkovic et al. | 348/155 |
| 2003/0105976 | A1 | 6/2003 | Copeland, III | 713/201 |
| 2003/0145226 | A1 | 7/2003 | Bruton, III et al. | 713/201 |
| 2003/0154399 | A1 | 8/2003 | Zuk et al. | 713/201 |
| 2003/0177383 | A1 | 9/2003 | Ofek et al. | 713/200 |
| 2003/0188189 | A1 | 10/2003 | Desai et al. | 713/201 |
| 2003/0200236 | A1 | 10/2003 | Hong | |
| 2003/0217289 | A1 | 11/2003 | Ammon et al. | 713/201 |
| 2004/0015719 | A1 | 1/2004 | Lee et al. | 713/201 |
| 2004/0024855 | A1 | 2/2004 | Tsai et al. | 709/223 |
| 2004/0025044 | A1* | 2/2004 | Day | 713/200 |
| 2004/0044912 | A1 | 3/2004 | Connary et al. | 713/201 |
| 2004/0049698 | A1 | 3/2004 | Ott et al. | 713/201 |
| 2004/0098623 | A1 | 5/2004 | Scheidell | 713/201 |
| 2004/0103211 | A1 | 5/2004 | Jackson et al. | 709/244 |
| 2004/0107125 | A1 | 6/2004 | Guheen et al. | 705/7 |
| 2004/0117407 | A1* | 6/2004 | Kumar et al. | 707/200 |
| 2004/0117654 | A1 | 6/2004 | Feldman et al. | |
| 2004/0133543 | A1* | 7/2004 | Shlaes et al. | 707/1 |
| 2004/0172557 | A1 | 9/2004 | Nakae et al. | 713/201 |
| 2004/0193943 | A1 | 9/2004 | Angelino et al. | 714/4 |
| 2004/0215977 | A1 | 10/2004 | Goodman et al. | |
| 2004/0260945 | A1 | 12/2004 | Raikar et al. | 713/201 |
| 2004/0261116 | A1 | 12/2004 | Mckeown et al. | 725/109 |
| 2004/0267886 | A1 | 12/2004 | Malik | |
| 2005/0035965 | A1 | 2/2005 | Sloan et al. | |
| 2005/0044406 | A1 | 2/2005 | Stute | 713/201 |
| 2005/0047670 | A1 | 3/2005 | Qian et al. | |
| 2005/0108518 | A1 | 5/2005 | Pandya | 713/151 |
| 2005/0138110 | A1 | 6/2005 | Redlich et al. | 709/201 |
| 2005/0222996 | A1* | 10/2005 | Yalamanchi | 707/4 |
| 2005/0254654 | A1 | 11/2005 | Rockwell et al. | 380/270 |
| 2006/0010493 | A1 | 1/2006 | Piesco et al. | 726/23 |
| 2006/0031934 | A1 | 2/2006 | Kriegel | 726/22 |
| 2006/0130070 | A1 | 6/2006 | Graf | 719/318 |
| 2006/0209836 | A1 | 9/2006 | Ke et al. | 370/392 |
| 2006/0253905 | A1 | 11/2006 | Mansel | 726/23 |
| 2006/0253907 | A1 | 11/2006 | McConnell | 726/23 |
| 2007/0009160 | A1 | 1/2007 | Loo et al. | |
| 2007/0157312 | A1* | 7/2007 | Joubert et al. | 726/22 |

OTHER PUBLICATIONS

U.S. Appl. No. 10/407,513, entitled "*Vertically Extensible Intrusion Detection System and Method*", inventors Jon-Michael C. Brook, et al., 44 pages plus 7 pages of drawings, Filing date Apr. 4, 2003.

U.S. Appl. No. 10/407,700, entitled "*Dynamic Rule Generation for an Enterprise Intrusion Detection System*", inventors Jon-Michael C. Brook, et al., 38 pages plus 7 pages of drawings, Filing date Apr. 4, 2003.

U.S. Appl. No. 10/407,030, entitled "*Graphical User Interface for an Enterprise Intrusion Detection System*", inventors Jon-Michael C. Brook, et al., 34 pages plus 7 pages of drawings, Filing date Apr. 4, 2003.

U.S. Appl. No. 11/176,436, entitled "*System and Method for Active Data Collection in a Network Security System*", inventor Troy D. Rockwood, 23 pages plus 2 pages of drawings, Filing date Jul. 6, 2005.

U.S. Appl. No. 11/219,291, entitled "*System and Method for Collaborative Information Security Correlation in Low Bandwidth Environments*", inventor Troy D. Rockwood, 44 pages plus 7 pages of drawings, Filing date Sep. 1, 2005.

U.S. Appl. No. 11/219,025, entitled "*System and Method for Interactive Correlation Rule Design in a Network Security System*", inventor Troy D. Rockwood, 31 pages plus 4 pages of drawings, Filing date Sep. 1, 2005.

U.S. Appl. No. 11/219,595, entitled "*System and Method for Intruder Tracking Using Advanced Correlation in a Network Security System*", inventor Troy D. Rockwood, 43 pages plus 7 pages of drawings, Filing date Sep. 1, 2005.

Rockwood, T.D., *USPTO, Office Action* for U.S. Appl. No. 11/176,436, filed Jul. 6, 2005, mailed Aug. 7, 2009, 12 pages, Aug. 7, 2009.

Jiang, Qin, *USPTO, Office Action* for U.S. Appl. No. 11/559,786, filed Nov. 14, 2006, mailed Aug. 10, 2009, 9 pages, Aug. 10, 2009.

Jun Li, et al.; *Multi-Tier Intrusion Detection System*; 11 pages.

*Handbook 13; Intrusion Detection and Audit Analysis, Version 1.0*; Australian Communications-Electronic Security Instruction 33 (ACSI33); 13 pages.

N. Hari Narayanan, et al.; *A Methodology for Knowledge Acquisition and Reasoning in Failure Analysis of Systems*; IEEE Transactions on Systems, Man, and Cybernetics; vol. SMC-17, No. 2; pp. 274-288, 1987.

Henry S. Vaccaro; *Detection of Anomalous Computer Session Activity*; IEEE Symposium on Research in Security and Privacy; 24 pages, May 1989.

Henry S. Teng, et al.; *Security Audit Trail Analysis Using Inductively Generated Predictive Rules*; IEEE; CH2842-3/90/0000/0024; pp. 24-29, 1990.

Henry S. Teng, et al.; *Adaptive Real-Time Anomaly Detection Using Inductively Generated Sequential Patterns*; IEEE; CH2884-5/90/0000/0278; pp. 278-284, 1990.

Allen Gersho, et al.; *Vector Quantization and Signal Compression*; Kluwer Academic Publishers; 736 pages, 1992.

Keith C. C. Chan, et al.; *Learning Sequential Patterns for Probabilistic Inductive Prediction*; IEEE Transactions on Systems, Man, and Cybernetics; vol. 24, No. 10; 16 pages, Oct. 1994.

F. Girault, et al.; *Linear Logic as a Tool for Reasoning on a Petri Net Model*; IEEE Symposium on Emerging Technologies and Factory Automation; 11 pages, Oct. 1995.

P. Nassery, et al.; *Real Time Seismic Signal Processing Using the ARMA Model Coefficients and an Intelligent Monitoring System*; IEEE TENCON—Speech and Image Technologies for Computing and Telecommunications; pp. 807-810, 1997.

Moataz A. Ahmed, et al.; *Rule-Based Information Distribution Systems: Near-Optimal Rule Sets Generations*; IEEE; 0-7803-4778-1; pp. 1564-1569, 1998.

P. Lang, et al.; *A Graphical Editor for the Conceptual Design of Business Rules*; 1 page, Feb. 1998.

Alistair G. Sutcliffe, et al.; *Supporting Scenario-Based Requirements Engineering*; IEEE Transactions on Software Engineering; vol. 24, No. 12; pp. 1072-1088, Dec. 1998.

Adrian K. Rantilla, et al.; *Aggregation of Expert Opinions*; Proceedings of the 32nd Hawaii International Conference on System Sciences; IEEE 0-7695-0001-3/99; pp. 1-11, 1999.

S. F. Wu, et al.; *JiNao Design and Implementation of a Scalable Intrusion Detection System for the OSPF Routing Protocol*; pp. 0-23, Feb. 24, 1999.

Slavica Jonic, et al.; *Three Machine Learning Techniques for Automatic Determination of Rules to Control Locomotion*; IEEE Transactions on Biomedical Engineering; vol. 46, No. 3; pp. 300-310, Mar. 1999.

Ian Ho, et al.; *Generating Test Cases for Real-Time Software by Time Petri Nets Model*; Proceedings Eighth Asian Test Symposium; 7 pages, Nov. 1999.
Cisco Systems, Inc.; *NetRanger User Guide 2.2.1*; Chapters 1-9 and Appendices A-C; 306 pages, 2000.
Sanjoy Dasgupta; *Experiments with Random Projections*; 9 pages, 2000.
Y. F. Jou, et al.; *Design and Implementation of a Scalable Intrusion Detection System for the Protection of Network Infrastructure*; 15 pages, Jan. 2000.
Virtyt Koshi; *Radio Network Planning for Ultra TDD Systems*; First International Conference on 3G Mobile Communication Technologies; 7 pages, Mar. 2000.
Chuck Boeckman; *Getting Closer to Policy-Based Intrusion Detection*; Information Security Bulletin; 6 pages, May 2000.
W. Jansen, et al.; *Mobile Agents in Intrusion Detection and Response*; Proceedings of the 12th Annual Canadian Information Technology Security Symposium; 12 pages, Jun. 2000.
Ilham Benyahia, et al.; *An Adaptive Framework for Distributed Complex Applications Development*; Proceedings 34th International Conference on Technology of Object-Oriented Languages and Systems; 12 Pages, Jul. 2000.
Stephen Northcutt, et al.; *Network Intrusion Detection; An Analyst's Handbook*; Second Edition; 18 pages, Sep. 2000.
Manh Phung; *SANS—Intrusion Detection FAQ, Data Mining in Intrusion Detection*; 3 pages, Oct. 24, 2000.
Tae-Sic Yoo, et al.; *New Results on Decentralized Supervisory Control of Discrete-Event Systems*; 6 pages, Dec. 2000.
Rebecca Bace, et al.; *Intrusion Detection Systems*; NIST Special Publication on Intrusion Detection System; 51 pages, Feb. 2001.
"Stick"—*A potential Denial of Service Against IDS Systems*; Internet Security Systems Security Alert; 2 pages, Mar. 14, 2001.
Andrew Arnold; *Kernel Based Anomaly Detection*; Intrusion Detection Systems, Machine Learning Group; Columbia University; 2 pages, Apr. 26, 2001.
Sheng Ma, et al.; *Event Miner: An Integrated Mining Tool for Scalable Analysis of Event Data*; 17 pages, May 21, 2001.
Feiyi Wang, et al.; *SITAR: A Scalable Intrusion-Tolerant Architecture for Distributed Services*; Proceedings of the 2001 IEEE Workshop on Information Assurance and Security; ISBN 0-7803-9814-9; pp. 38-45, Jun. 2001.
*Network Intrusion Detection System*; SecureNet Series; 6 pages, Jul. 2001.
Ping-Peng Yuan, et al.; *An Event and Service Interacting Model and Event Detection Based on the Broker/Service Model*; pp. 20-24, Jul. 2001.
Rakesh Raghudharan; *Intrusion Detection Systems: Beyond the First Line of Defense*; Network Magazine; 7 pages, Sep. 2001.
Betsy Yocom, et al.; *Review: Intrusion-Detection Products Grow Up*; Network World; 12 pages, Oct. 08, 2001.
W. E. Brown, et al.; *Estimation of Ocean Bottom Scattering Strength Using Discrete Eigenray Matching in Shallow Water*; MTS 0-933-957-28-9; pp. 1636-1639, Nov. 2001.
Symantec™ ManHunt™, *Reducing the Risk of Compromise*; Intrusion Detection; 4 pages, 2002.
XiaoShu Hang, et al.; *A FSA-Based Approach for Mining Sequential Patterns with User-Specified Skeletons*; Proceedings of the 4th World Congress on Intelligent Control and Automation; 6 pages, Jun. 2002.
Azizi Ab Aziz, et al.; *Development of an Adaptive Business Insolvency Classifier Prototype (AVICENA) Using Hybrid Intelligent Algorithms*; Proceedings Globalizing Research and Development in Electrical and Electronics Engineering; 5 pages, Jul. 2002.
Richard Power; *CSI Roundtable: Experts Discuss Present and Future Intrusion Detection Systems*; Computer Security Journal; vol. XIV, #1; 15 pages, 2003.
Loganathan Lingappan, et al.; *Test Generation for Non-Separable RTL Controller-Datapath Circuits Using a Satisfiability Based Approach*; Proceedings of the 21st International Conference on Computer Design; 7 pages, 2003.
D. Curry, et al.; *Intrusion Detection Message Exchange Format Data Model and Extensible Markup Language (XML) Document Type Definition*; Intrusion Detection Working Group; 116 pages, Jan. 30, 2003.

*ISS RealSecure® Protection System*; ISS Corporation; 5 pages, Apr. 1, 2003.
F. Y. Nakamoto, et al.; *Systematization of the Project of the Production System Control*; IEEE International Symposium on Industrial Electronics; 8 pages, Jun. 2003.
Nicholas Pioch, et al.; *CADRE: Continuous Analysis and Discovery from Relational Evidence*; International Conference on Integration of Knowledge Intensive Multi-Agent Systems; 9 pages, Sep. 2003.
Peng Ning, et al.; *Techniques and Tools for Analyzing Intrusion Alerts*; ACM Transactions on Information and Systems Security; vol. 7, No. 2; 45 pages, May 2004.
Andrew Hamilton-Wright, et al.; *Constructing a Fuzzy Rule Based Classification System Using Pattern Discovery*; NAFIPS 2005—2005 Annual Meeting of the North American Fuzzy Information Processing Society; pp. 460-465, 2005.
USPTO; Office Action for U.S. Appl. No. 10/407,700, filed Apr. 4, 2003 in the name of Jon-Michael C. Brook; 10 pages, Aug. 9, 2006.
Patent Pending U.S. Appl. No. 11/559,786 entitled *Compressing N-Dimensional Data* in the name of Qin Jiang, et al.; 34 total pages, Filed Nov. 14, 2006.
USPTO; Office Action for U.S. Appl. No. 10/407,030, filed Apr. 4, 2003 in the name of Jon-Michael C. Brook; 9 pages, Jan. 8, 2007.
USPTO; Office Action for U.S. Appl. No. 10/407,513, filed Apr. 4, 2003 in the name of Jon-Michael C. Brook; 12 pages, Mar. 27, 2007.
USPTO; Office Action for U.S. Appl. No. 10/407,700, filed Apr. 4, 2003 in the name of Jon-Michael C. Brook; 9 pages, Apr. 19, 2007.
USPTO; Office Action for U.S. Appl. No. 11/219,595, filed Sep. 1, 2005 in the name of Troy Dean Rockwood; 17 pages, Jun. 7, 2007.
USPTO; Advisory Action for U.S. Appl. No. 10/407 700, filed Apr. 4, 2003 in the name of Jon-Michael C. Brook; 3 pages, Jul. 6, 2007.
USPTO; Notice of Allowance and Fee(s) Due for U.S. Appl. No. 10/407,030, filed Apr. 4, 2003 in the name of Jon-Michael C. Brook; 15 pages, Aug. 24, 2007.
USPTO; Notice of Allowance and Fee(s) Due for U.S. Appl. No. 10/407,513, filed Apr. 4, 2003 in the name of Jon-Michael C. Brook; 17 pages, Nov. 6, 2007.
USPTO: Notice of Allowance and Fee(s) Due for U.S. Appl. No. 11/219,595, filed Sep. 1, 2005 in the name of Troy Dean Rockwood; 6 pages, Nov. 7, 2007.
USPTO; Office Action for U.S. Appl. No. 11/219,025, filed Sep. 1, 2005 in the name of Troy Dean Rockwood; 11 pages, Mar. 24, 2008.
USPTO; Office Action for U.S. Appl. No. 11/219,025, filed Sep. 1, 2005 in the name of Troy Dean Rockwood; 12 pages, Sep. 10, 2008.
USPTO; Advisory Action for U.S. Appl. No. 11/219,025, filed Sep. 1, 2005 in the name of Troy Dean Rockwood; 3 pages, Nov. 20, 2008.
USPTO; Office Action for U.S. Appl. No. 11/219,291, filed Sep. 1, 2005 in the name of Troy Dean Rockwood; 33 pages, Dec. 11, 2008.
*IEEE Xplore Release 2.5 Search Results*; 4 pages, Retrieved Jan. 6, 2009.
USPTO; Office Action for U.S. Appl. No. 11/219,025, filed Sep. 1, 2005 in the name of Troy Dean Rockwood; 16 pages, Jan. 15, 2009.
USPTO; Office Action for U.S. Appl. No. 11/176,436, filed Jul. 6, 2005 in the name of Troy Dean Rockwood; 29 pages, Feb. 10, 2009.
USPTO; Office Action for U.S. Appl. No. 10/407,700, filed Apr. 4, 2003 in the name of Jon-Michael C. Brook; 7 pages, Apr. 17, 2009.
USPTO; Office Action for U.S. Appl. No. 11/219,291, filed Sep. 1, 2005 in the name of Troy Dean Rockwood; 36 pages, May 20, 2009.
USPTO; Office Action for U.S. Appl. No. 11/219,025, filed Sep. 1, 2005 in the name of Troy Dean Rockwood; 12 pages, Jul. 22, 2009.
Noel et al., "Correlating Intrusion Events and Building Attack Scenarios Through Attack Graph Distances", 2004, Computer Security Applications Conferences, 2004, 20th Annual, 10 pages.
USPTO; Office Action for U.S. Appl. No. 10/407,700, filed Apr. 4, 2003 in the name of Joh-Michael Brook; 4 pages, Oct. 16, 2009.
USPTO Office Action, U.S. Appl. No. 11/219,291, filed Sep. 1, 2005, Troy Dean Rockwood; 34 pages, Dec. 11, 2009.
USPTO Office Action, U.S. Appl. No. 11/176,436, filed Jul. 6, 2005, Troy Dean Rockwood; 20 pages, Dec. 24, 2009.
USPTO; Office Action for U.S. Appl. No. 11/219,025, filed Sep. 1, 2005, inventor Troy Dean Rockwood; 12 pages, Jan. 5, 2010.
USPTO; Office Action for U.S. Appl. No. 11/559,786, filed Nov. 14, 2006 in the name of Qin Jiang; 22 pages, Jan. 22, 2010.

USPTO; Office Action for U.S. Appl. No. 10/407,700 filed Apr. 4, 2003 in the name of Jon-Michael C. Brook; 5 pages, Apr. 14, 2010.
USPTO; Office Action for U.S. Appl. No. 10/407,700 filed Apr. 4, 2003 in the name of Jon-Michael C. Brook; 4 pages, Oct. 16, 2009.
USPTO; Final Office Action, U.S. Appl. No. 11/219,025 filed Sep. 1, 2005, Inventor Troy Dean Rockwood; May 28, 2010, 13 pages, May 28, 2010.
USPTO; Office Action for U.S. Appl. No. 11/176,436 filed Jul. 6, 2005 in the name of Troy Dean Rockwood; 22 pages; Jun. 3, 2010.
USPTO; Office Action, U.S. Appl. No. 11/219,291 filed Sep. 1, 2005 in the name of Troy Dean Rockwood; 36 pages, Jun. 24, 2010.
Rockwood, "Response Pursuant to 37 C.F.R. §1.111," U.S. Appl. No. 11/219,025, 11 pages, filed with USPTO Jun. 24, 2008.
Rockwood, "Response Pursuant to 37 C.F.R. §1.111," U.S. Appl. No. 11/219,025, 16 pages, filed with USPTO Apr. 14, 2009.
Rockwood, "Response Pursuant to 37 C.F.R. §1.111," U.S. Appl. No. 11/176,436, 12 pages, filed with USPTO May 11, 2009.
Rockwood, "Response Pursuant to 37 C.F.R. §1.111," U.S. Appl. No. 11/219,291, 14 pages, filed with USPTO Aug. 20, 2009.
Rockwood, "Response Pursuant to 37 C.F.R. §1.116," U.S. Appl. No. 11/219,025, 11 pages, filed with USPTO Oct. 22, 2009.
Rockwood, "Response Pursuant to 37 C.F.R. §1.116," U.S. Appl. No. 11/176,436, 11 pages, filed with USPTO Oct. 7, 2009.
Rockwood, "Response Pursuant to 37 C.F.R. §1.116," U.S. Appl. No. 11/219,025, 12 pages, filed with USPTO Nov. 10, 2008.
Rockwood, "Response Pursuant to 37 C.F.R. §1.111," U.S. Appl. No. 11/219,291, 13 pages, filed with USPTO Mar. 11, 2010.
Rockwood, "Response Pursuant to 37 C.F.R. §1.111," U.S. Appl. No. 11/176,436, 13 pages, filed with USPTO Mar. 24, 2010.
Rockwood, "Response Pursuant to 37 C.F.R. §1.111," U.S. Appl. No. 11/219,025, 14 pages, filed with USPTO Apr. 5, 2010.
Brook et al., "Response Pursuant to 37 C.F.R. §1.111," U.S. Appl. No. 10/407,700, 12 pages, filed with USPTO Jul. 14, 2010.
Brook et al., "Response Pursuant to 37 C.F.R. §1.111," U.S. Appl. No. 10/407,700, 3 pages, filed with USPTO Jan. 19, 2010.
Rockwood, "Response Pursuant to 37 C.F.R. §1.111," U.S. Appl. No. 11/559,786, 13 pages, filed with USPTO Apr. 22, 2010.
Rockwood, "Response Pursuant to 37 C.F.R. §1.111," U.S. Appl. No. 11/559,786, 12 pages, filed with USPTO Nov. 10, 2009.
Liu et al., "Incremental Maintenance of Nested Relational Views," Database Engineering and Applications, 1999, 9 pages, Aug. 2-4, 1999.
Noel et al., "Correlating Intrusion Events and Building Attack Scenarios Through Attack Graph Distances", 2004, Computer Security Applications Conferences, 2004, 20th Annual, 10 pages, 2004.

* cited by examiner

| | ATTRIBUTE 410a | ATTRIBUTE 410b | ATTRIBUTE 410c | ATTRIBUTE VALUE 420a | ATTRIBUTE VALUE 420b | ATTRIBUTE VALUE 420c |
|---|---|---|---|---|---|---|
| DETECTED EVENT 110a | 5:25 P.M. | 205.252.48.163 | 192.187.23.220 | 17.42 | 3455856803 | 3233486812 |
| DETECTED EVENT 110b | 2:02 P.M. | 205.252.48.240 | 192.187.23.206 | 14.03 | 3455856880 | 3233486798 |
| DETECTED EVENT 110c | 5:10 P.M. | 205.252.48.168 | 192.187.23.102 | 17.17 | 3455856808 | 3233486694 |
| TARGET EVENT 110d | 5:20 P.M. | 205.252.48.166 | 192.187.23.110 | 17.33 | 3455856806 | 3233486702 |
| PROXIMITY LIMITS 364 | 45 MINUTES | 20 | 30 | 0.75 | 20 | 30 |

FIG. 7

EVENT TABLE 710

| EVENT IDENTIFIER | TIME (GMT) | DATE | SOURCE IP ADDRESS | DESTINATION IP ADDRESS | DESTINATION PORT |
|---|---|---|---|---|---|
| $110_1$ | 2:37:45 | 7/8/2005 | 2.4.6.2 | 5.4.3.2 | 64 |
| $110_2$ | 4:15:32 | 7/8/2005 | 3.4.5.1 | 5.4.3.3 | 80 |
| $110_3$ | 12:03:42 | 7/8/2005 | 1.2.3.4 | 5.4.4.4 | 80 |
| $110_4$ | 1:21:01 | 7/9/2005 | 3.4.5.1 | 5.4.1.1 | 62 |
| $110_5$ | 2:48:32 | 7/10/2005 | 2.4.6.2 | 5.4.3.2 | 70 |
| $110_6$ | 13:23:54 | 7/10/2005 | 1.2.3.4 | 5.4.4.4 | 74 |
| $110_7$ | 16:58:31 | 7/10/2005 | 3.2.5.1 | 5.4.3.2 | 72 |
| $110_8$ | 18:23:13 | 7/10/2005 | 1.1.3.3 | 5.1.1.1 | 70 |
| $110_9$ | 5:43:42 | 7/11/2005 | 1.2.3.4 | 5.4.2.5 | 64 |
| $110_{10}$ | 6:02:02 | 7/11/2005 | 2.2.2.2 | 5.3.2.5 | 72 |
| $110_{11}$ | 8:14:06 | 7/12/2005 | 3.2.5.1 | 5.2.3.2 | 76 |
| $110_{12}$ | 10:21:01 | 7/12/2005 | 4.3.3.4 | 5.4.3.3 | 64 |
| $110_{13}$ | 11:21:01 | 7/12/2005 | 1.1.3.3 | 5.4.2.5 | 62 |
| $110_{14}$ | 2:48:32 | 7/15/2005 | 1.2.3.4 | 5.3.2.5 | 70 |
| $110_{15}$ | 13:23:54 | 7/15/2005 | 2.2.2.2 | 5.2.3.2 | 74 |
| $110_{16}$ | 16:58:31 | 7/16/2005 | 2.2.2.3 | 5.4.3.3 | 72 |

| CORRELATION UPDATE TABLE | | |
|---|---|---|
| SUBQUERY IDENTIFIER | SUBQUERY | CORRELATION UPDATE TIME (GMT) |
| $814_1$ | source_IP=3.4.5.1 | 07/16/2005 16:58:31 |
| $814_2$ | dest_port=80 | 07/16/2005 16:58:31 |
| $814_3$ | day_of_week=3 | 07/16/2005 16:58:31 |

| CORRELATION RESULTS TABLE | |
|---|---|
| SUBQUERY IDENTIFIER | EVENT IDENTIFIER |
| $814_1$ | $110_2$ |
| $814_1$ | $110_4$ |
| $814_2$ | $110_2$ |
| $814_2$ | $110_3$ |
| $814_3$ | $110_{11}$ |
| $814_3$ | $110_{12}$ |
| $814_3$ | $110_{13}$ |

| METRIC UPDATE TABLE | |
|---|---|
| METRIC IDENTIFIER | METRIC UPDATE TIME |
| $822_1$ | 07/11/2005 6:02:02 |

| ATTRIBUTE VALUE TABLE | | |
|---|---|---|
| METRIC IDENTIFIER | EVENT IDENTIFIER | ATTRIBUTE VALUE |
| $822_1$ | $110_1$ | 6 |
| $822_1$ | $110_2$ | 6 |
| $822_1$ | $110_3$ | 6 |
| $822_1$ | $110_4$ | 7 |
| $822_1$ | $110_5$ | 1 |
| $822_1$ | $110_6$ | 1 |
| $822_1$ | $110_7$ | 1 |
| $822_1$ | $110_8$ | 1 |
| $822_1$ | $110_9$ | 2 |
| $822_1$ | $110_{10}$ | 2 |
| $822_1$ | $110_{11}$ | 3 |
| $822_1$ | $110_{12}$ | 3 |
| $822_1$ | $110_{13}$ | 3 |
| $822_1$ | $110_{14}$ | 6 |
| $822_1$ | $110_{15}$ | 6 |
| $822_1$ | $110_{16}$ | 7 |

822      810      420

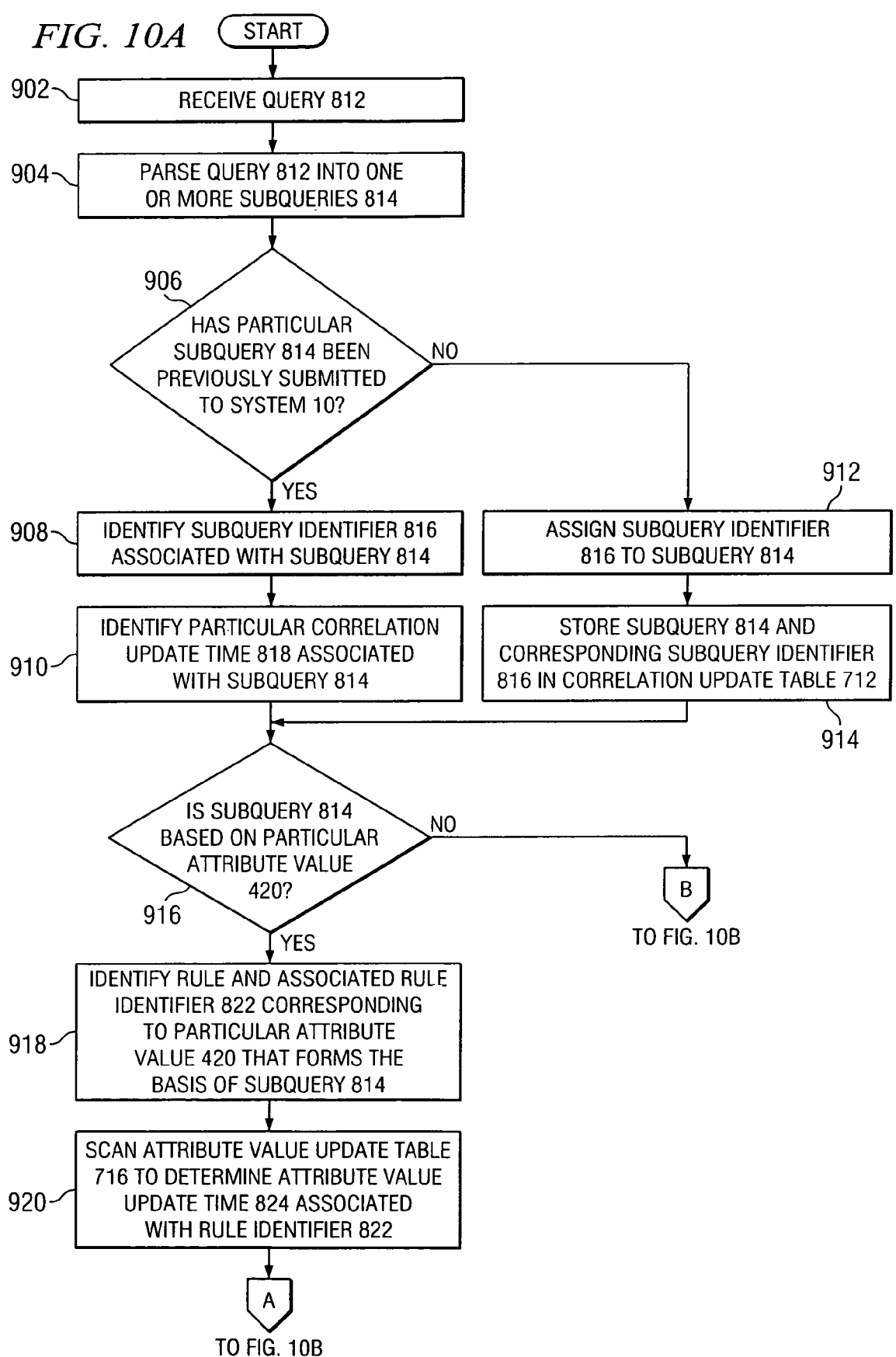

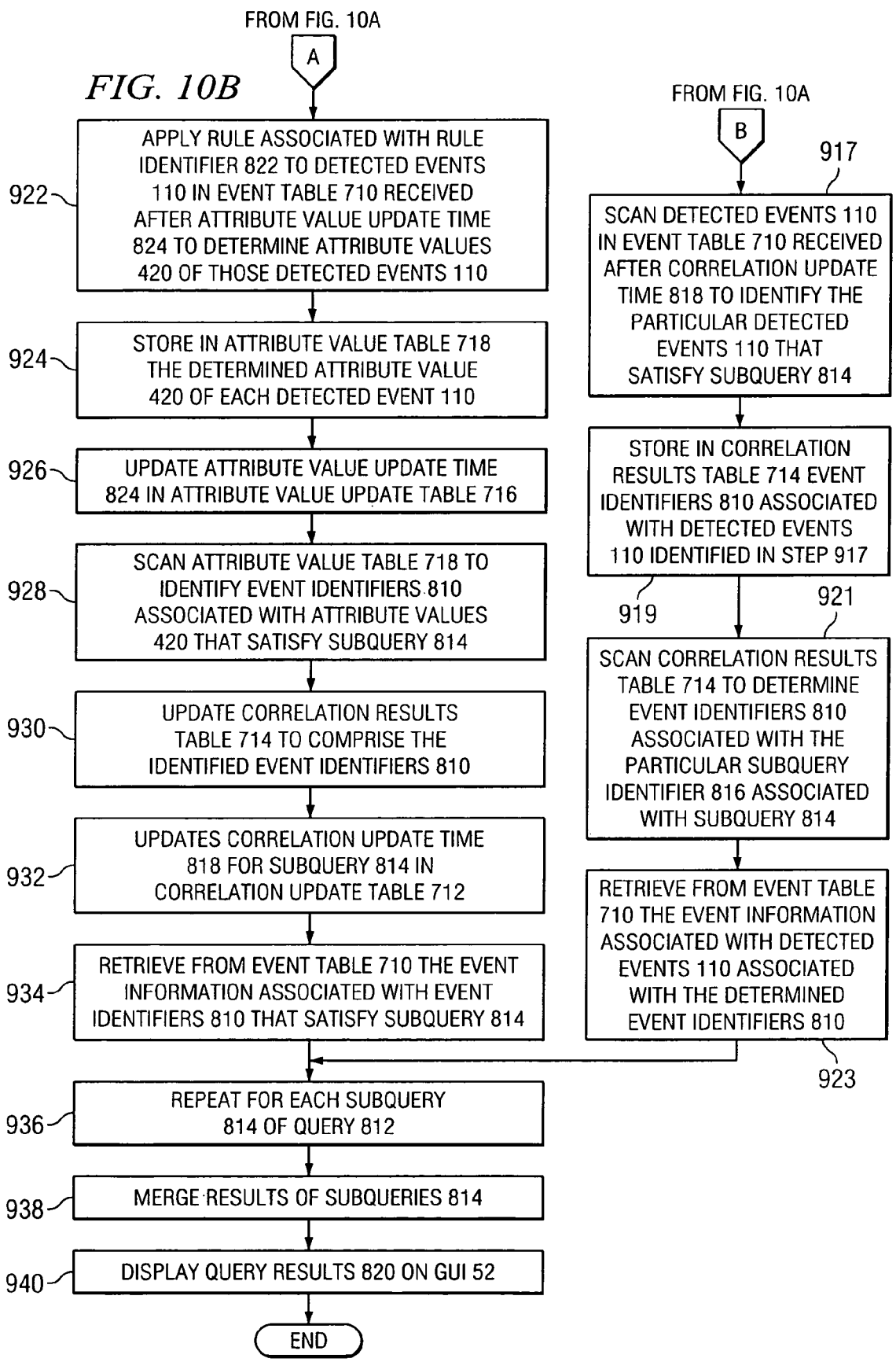

SYSTEM AND METHOD FOR ATTACKER ATTRIBUTION IN A NETWORK SECURITY SYSTEM

TECHNICAL FIELD OF THE INVENTION

This invention relates to intrusion detection systems and more specifically to a system and method for attacker attribution in a network security system.

BACKGROUND OF THE INVENTION

Intrusion detection systems are used by an enterprise to detect and identify unauthorized or unwanted use (commonly called an attack) of the enterprise's computer network, which normally comprises a large number of nodes and network operations centers. In general, these enterprise intrusion detection systems receive data using sensors or other intrusion detection devices. The system typically correlates the incoming data with stored data according to rules designed to detect specific patterns in network traffic, audit trails, and other data sources to detect attacks on the enterprise's computer network. The system does not, however, determine the likely identity of attackers. In addition, the correlation of data typically requires numerous, time-consuming operations.

SUMMARY OF THE INVENTION

In accordance with the present invention, the disadvantages and problems associated with traditional intruder tracking for network security systems have been substantially reduced or eliminated.

In one embodiment of the present invention, a method for correlating event information comprises receiving a query associated with an attribute value of a detected event. The method continues by identifying a rule for determining the attribute value, the rule associated with a rule identifier. The method continues by identifying in a first table a rule update time associated with the rule. The method continues by determining attribute values for a plurality of detected events stored in a second table, wherein the plurality of detected events occurred after the rule update time and are associated with event identifiers. The method continues by storing in a third table the determined attribute values and the event identifiers. The method concludes by identifying in the third table one or more event identifiers associated with one or more attribute values that satisfy the query.

The invention has several important technical advantages. Various embodiments of the invention may have none, some, or all of these advantages. One advantage is that the present invention reduces the number of operations required to correlate detected events with stored events, resulting in faster correlations. The present invention also caches prior queries and query results, thus reducing the time needed to process complex queries. In addition, the present invention enables an intrusion detection system to determine the likely identity of attackers. By quickly identifying attackers, an operator of an intrusion detection system is better able to respond to attacks, preempt future attacks, and gather evidence against attackers.

Other technical advantages of the present invention will be readily apparent to one skilled in the art from the description and the appended claims.

BRIEF DESCRIPTION OF THE DRAWINGS

For a more complete understanding of the present invention and its advantages, reference is now made to the following description, taken in conjunction with the accompanying drawings, in which:

FIG. 7 illustrates an event table according to certain embodiments of the present invention;

FIG. 8a illustrates a correlation update table according to certain embodiments of the present invention;

FIG. 8b illustrates a correlation results table according to certain embodiments of the present invention;

FIG. 9a illustrates an attribute value update table according to certain embodiments of the present invention;

FIG. 9b illustrates an attribute value table according to certain embodiments of the present invention; and FIGS. 10A & 10B illustrate a flow chart for correlating event information according to one embodiment of the present invention.

DETAILED DESCRIPTION OF THE INVENTION

Figure 1:
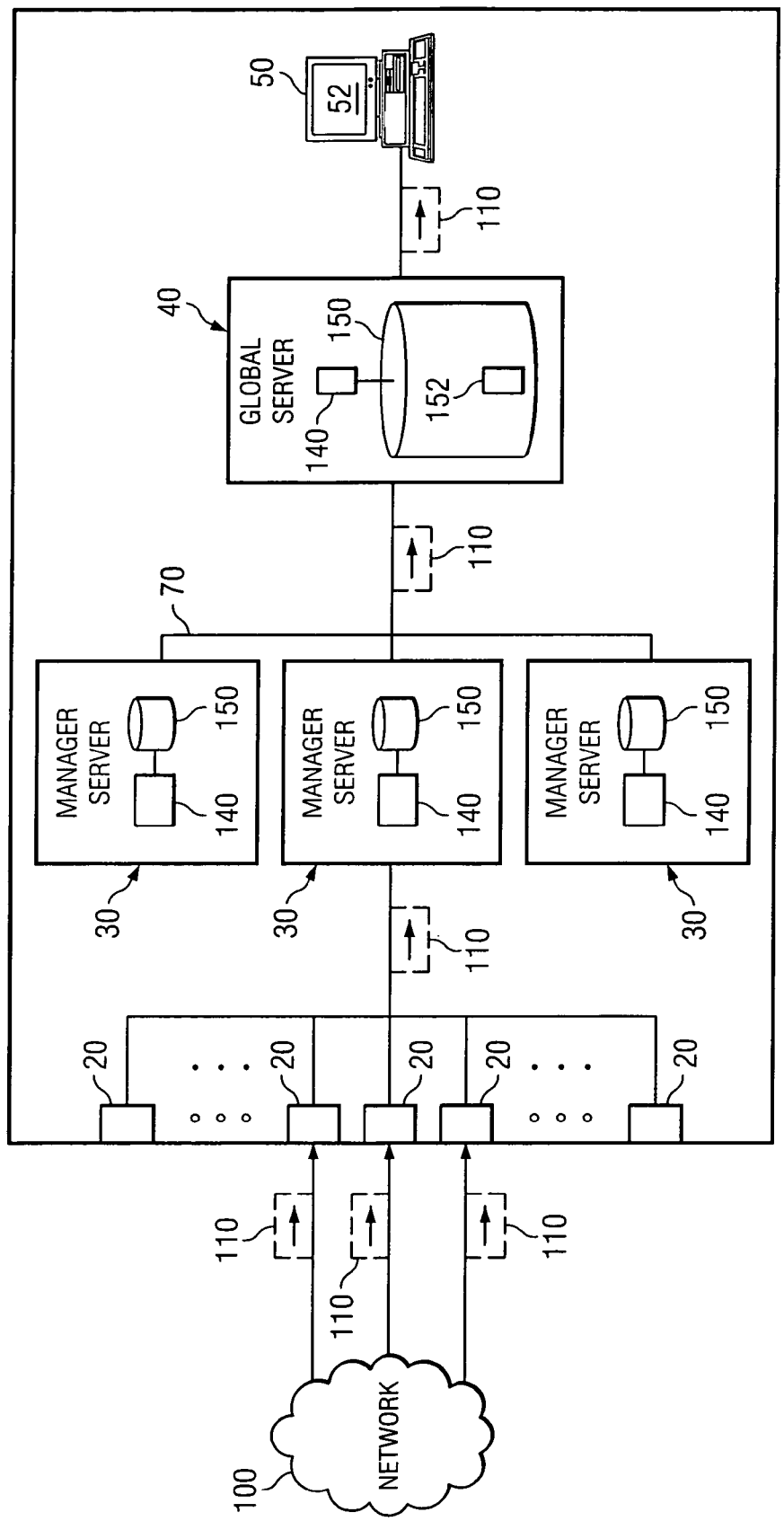
FIG. 1 illustrates an intrusion detection system according to one embodiment of the present invention.

FIG. 1 illustrates an intrusion detection system 10 distributed across an enterprise system according to one embodiment of the present invention. Generally, system 10 collects and correllates data to detect attacks on an enterprise system. More specifically, system 10 is operable to use correlated data to detect attacks and identify attackers. These functions are the focus of FIGS. 2-5, discussed below. System 10 is further operable to cache correlated data, which enables system 10 to efficiently respond to queries submitted by an operator. These functions are the focus of FIGS. 6-10, discussed below.

As illustrated in FIG. 1, system 10 generally comprises one or more manager servers 30, a global server 40, a console 50, and a plurality of sensors 20 distributed across an enterprise system. These elements of system 10 may be communicatively coupled using an internal network 70.

The "enterprise" may comprise any business, government, military, organization, or other entity that has multiple network channels or ports to a network 100. Network 100 may include any suitable portions of an external network and/or an internal network. In this regard, intrusion detection system 10 monitors network communications on both external and internal links. For example, an enterprise may include three ports for external network communications including email, internet, and dialup. In this example, intrusion detection system 10 monitors network communications on the three external ports. Based upon data received in these input streams, system 10 attempts to detect, locate, or block an attack on the enterprise. An "attack" may be any malicious, destructive, or suspicious activity communicated from a source external and/or or internal to the portion of the enterprise protected by system 10. Attacks may include viruses, Trojan horses, worms, or any other piece of code or data that represents at least a portion of an unwanted attempt to access the protected portion of the enterprise.

Internal network 70 may include one or more intranets, local area networks (LANs), metropolitan area networks (MANs), wide area networks (WANs), or any other suitable enterprise network. Internal network 70 may, for example, communicate Internet Protocol (IP) packets, frame relay frames, Asynchronous Transfer Mode (ATM) cells, and/or other suitable messages between network addresses. According to particular embodiments, messages between the levels may be in one or more formats including Intrusion Detection Message Exchange Format (IDMEF), binary format, and/or other appropriate format.

Network 100 represents any network not protected by intrusion detection system 10. Accordingly, network 100 communicably couples system 10 with other computer systems. Network 100 may, for example, communicate Internet Protocol (IP) packets, frame relay frames, Asynchronous Transfer Mode (ATM) cells, and/or other suitable information between network addresses. Network 100 may include one or more intranets, local area networks (LANs), metropolitan area networks (MANs), wide area networks (WANs), all or a portion of the Internet, and/or any other communication system or systems at one or more locations. An external client system (not shown) may be any computer, enterprise or non-enterprise, which is trying to access the portion of internal network 70 protected by intrusion detection system 10. As used in this document, the term "computer" is intended to encompass a personal computer, server, mainframe, terminal, workstation, network computer, kiosk, wireless data port, wireless telephone, personal digital assistant (PDA), one or more processors within these or other devices, or any other suitable processing device.

Each sensor 20 is located at a network port that receives TCP/IP packets or other similar network communications from network 100. These packets and similar network communications received by sensors 20 are referred to as detected events 110. The data that makes up detected events 110 is referred to as event information. A detected event 110 may be an attack—that is, an unauthorized or unwanted use of the enterprise's computer network. Generally, sensor 20 processes detected events 110 to detect the presence of an attack. Sensor 20 outputs at least detected events 110, and according to certain embodiments, sensor 20 may generate an alert (not shown) upon detecting an attack. Sensor 20 may output the alert as part of a particular detected event 110 or as a distinct message.

Sensor 20 may use any suitable detection technique to process and output detected events 110 and appropriate alerts. For example, sensor 20 may use algorithms, signatures, scripts, or any suitable detection or comparison technique to process packet headers, packet payloads, and/or any other data. Sensor 20 may include any suitable combination of hardware, software, or firmware to receive detected events 110 from sources via network 100, process detected events 110, and communicate detected events 110 and alerts to higher levels. For example, sensor 20 may comprise a computer, server, lower-level intrusion detection system, firewall, or any module written in any appropriate computer language such as, for example, C, C++, Java, Perl, and others. It will be understood that while sensor 20 is illustrated as a single multi-tasked module, the features and functionality performed by this sensor 20 may be performed by multiple modules such as for example, a sensor module and a packet flow generation module. Additionally, to help ensure that each port is properly monitored, each sensor 20 may be associated with a redundant slave sensor which is operable to assume substantially all of the functionality of sensor 20 in the event of any failure of sensor 20.

Manager server 30 represents any hardware or software module that controls or monitors one or more servant nodes, such as sensor 20. In one example, each manager server 30 includes a correlation engine 140 and a ruleset 152 for receiving and correlating detected events 110 from sensors 20. Generally, through correlating and aggregating detected events 110, manager server 30 is capable of detecting an attack or potential attack spread among sensors 20. Manager server 30 is operable to dynamically respond to such a threat. For example, upon detecting an attack or potential attack, manager server 30 may disable certain network ports or restrict access to internal network 70.

According to certain embodiments, manager server 30 comprises a general-purpose personal computer (PC), a Macintosh, a workstation, a Unix-based computer, a server computer, or any suitable processing device. Manager server 30 may include any hardware, software, firmware, or combination thereof operable to receive and appropriately process detected events 110 and alerts (not shown) received from sensors 20. Manager server 30 outputs at least detected events 110. Manager server 30 is further operable to output alerts received from sensors 20 and/or alerts generated by manager server 30. According to certain embodiments, alerts received from sensors 20 or generated by manager server 30 may be combined with the event information of detected events 110. To make system 10 more robust, each manager server 30 may be associated with a redundant manager server which is operable to assume substantially all of the functionality of manager server 30 in the event of a failure of the associated manager server 30. Although FIG. 1 provides one example of manager server 30 that may be used with the invention, system 10 can be implemented using computers other than servers, as well as a server pool.

Global server 40 represents any hardware, software, firmware, or combination thereof operable to process, control, and monitor system 10 at the highest logical level. Global server 40 may comprise a general-purpose personal computer (PC), a workstation, a Unix-based computer, a server computer, or any other suitable processing device. Although FIG. 1 provides one example of global server 40 that may be used with the invention, system 10 can be implemented using computers other than servers, as well as a server pool.

According to certain embodiments, global server 40 comprises a correlation engine 140. Correlation engine 140 is operable to correlate detected events 110 to detect an attack occurring upon or within the enterprise. Correlation engine 140 is further operable to correlate detected events 110 with attacker profiles 224 (illustrated in FIG. 2) to identify the source of an attack. Correlation engine 140 may be any software or logic operable to process multiple communications from servant nodes and may use any suitable detection or comparison technique to process packet headers, packet payloads, and/or any other data. Correlation engine 140 may be written in any appropriate computer language such as, for example, C, C++, Java, Perl, and others. It will be understood by those skilled in the art that correlation engine 140 may reside locally in manager server 30, global server 40, remotely on another computer server, or distributed across servers. It will be further understood that while correlation engine 140 is illustrated as a single module, the features and functionalities performed by this module may be performed by multiple modules.

In certain embodiments, correlation engine 140 is communicatively connected to a memory module 150. Memory module 150 stores detected events 110 received by sensors 20 for later processing, retrieval, or searches. Memory module 150 may include any memory or database module and may take the form of volatile or non-volatile memory comprising, without limitation, magnetic media, optical media, random access memory (RAM), read-only memory (ROM), removable media, or any other suitable local or remote memory component. Correlation engine 140 is operable to process event information of detected events 110 stored in memory module 150 to detect the presence of a substantially long-term or multi-staged attack that had previously gone undetected by sensors 20 and manager servers 30.

According to certain embodiments, memory module 150 comprises a ruleset 152. Ruleset 152 comprises instructions, algorithms, or any other directives used by correlation engine 140 to process, correlate, aggregate, and/or filter event information of detected events 110. Ruleset 152 is discussed in further detail below with respect to FIG. 2. Although FIG. 1 illustrates ruleset 152 and memory module 150 as residing internally to global server 40, ruleset 152 and memory module 150 may reside externally or at any other location or locations accessible by global server 40 or other components of system 10.

Console 50 represents any computer that may comprise input devices, output devices, mass storage media, processors, memory, or other components for receiving, processing, storing, and/or communicating information. Intrusion detection system 10 may communicate the event information of detected events 110 to console 50 so that a user, such as an operator (not shown), may view and process the event information of detected events 110. Console 50 may be, alternatively or additionally, linked to one or more manager servers 30 and/or global servers 40 without departing from the scope of this disclosure. It will be understood that there may be any number of consoles 50 used in system 10.

Console 50 may include a graphical user interface (GUI) 52 that tailors and filters the data presented to the user. Generally, GUI 52 provides the operator of console 50 with an efficient and user-friendly presentation of event information of detected events 110. GUI 52 may open a secure shell (SSH) tunnel to provide additional secure communications between console 50 and the other portions of system 10. GUI 52 may comprise a plurality of displays having interactive fields, pull-down lists, and buttons operated by an operator. In one example, GUI 52 presents the relevant event information of each detected event 110 to the operator and conceals the remaining information in order to reduce visual clutter. Then, upon receiving a request from the operator, GUI 52 expands the visual representation of event information to display packet headers and payloads to the operator. GUI 52 may include multiple levels of abstraction including groupings and boundaries. It should be understood that the term graphical user interface may be used in the singular or in the plural to describe one or more graphical user interfaces and each of the displays of a particular graphical user interface.

Generally, system 10 uses sensors 20, manager server 30, and/or global server 40 to correlated detected events 110 and to detect attacks on an enterprise system. Manager server 30 and/or global server 40 may compare particular characteristics of detected events 110 to identify patterns and/or indicators that suggest the occurrence of an attack. Manager server 30 and/or global server 40 may further analyze detected events 110 to determine the likely identity of an attacker. These functions and operations are the focus of FIGS. 2-5, discussed below.

In addition to detecting attacks and identifying attackers, system 10 may receive from operator 60 queries based on particular characteristics of detected events 110. By caching queries and/or event information in memory module 150, system 10 may efficiently respond to queries submitted by operator 60. The caching of queries and event information is discussed below with respect to FIGS. 6-10.

Figure 2:
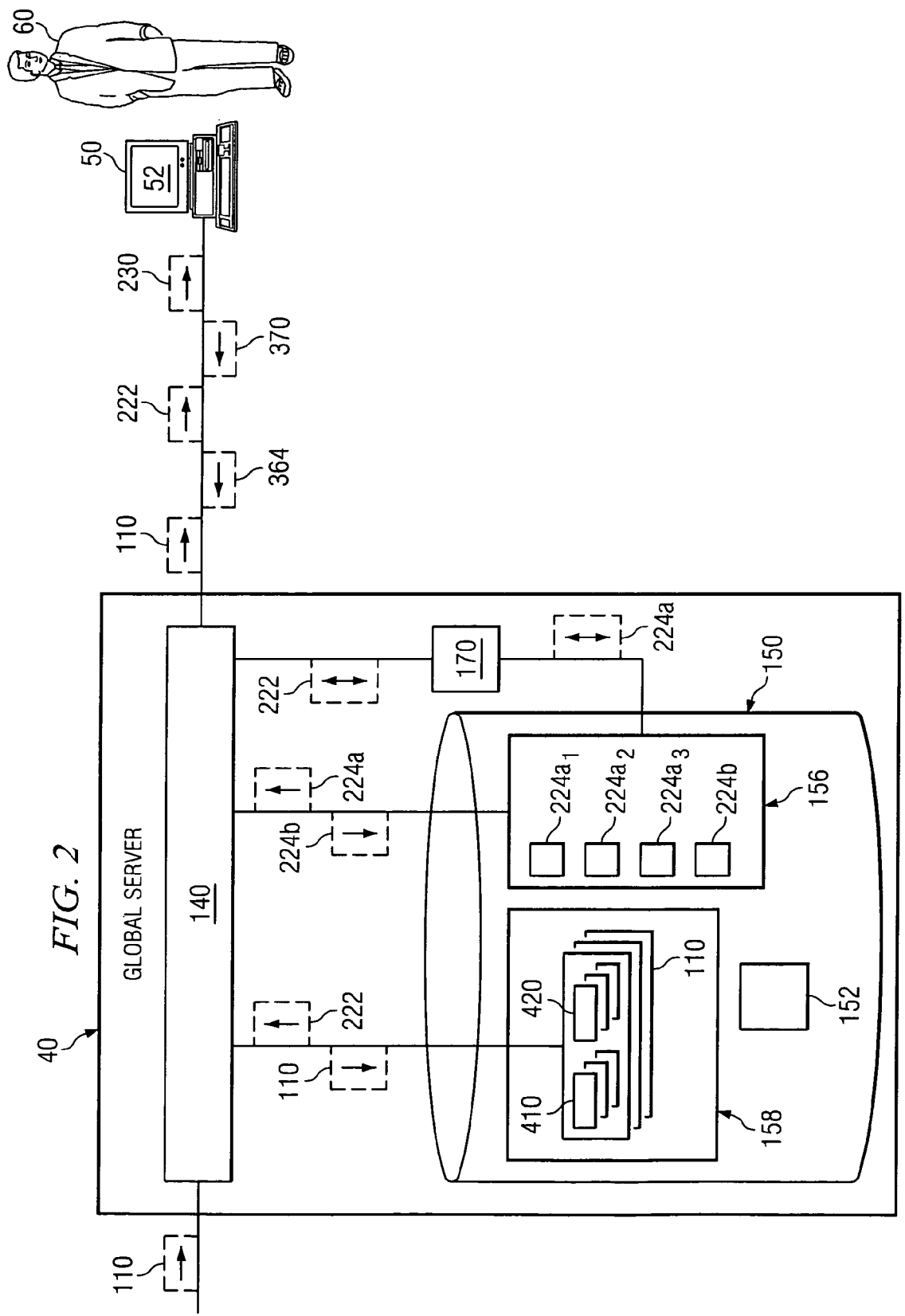
FIG. 2 illustrates a flow of operation among various components of the system illustrated in FIG. 1.

FIG. 2 illustrates a flow of operation among various components of system 10 illustrated in FIG. 1. Global server 40 receives detected events 110, such as from manager servers 30. Each detected event 110 comprises a plurality of characteristics such as, for example, time, source IP address, and destination IP address. These characteristics are referred to as attributes 410. Correlation engine 140 processes each detected event 110 according to attributes 410 of that detected event 110. In particular, correlation engine 140 assigns attribute values 420 to each detected event 110 according to the particular attributes 410 of that detected event 110. A particular attribute value 420 is a numerical value that corresponds to a particular attribute 410 of detected event 110. Correlation engine 140 uses rules stored in ruleset 152 to determine which attribute values 420 to assign to a particular detected event 110.

An example illustrates certain embodiments of the present invention. Global server 40 receives detected event 110a, which occurred at 5:25 p.m. and originated from source IP address 205.252.48.163. One attribute 410a of detected event 110a is time—5:25 p.m. Another attribute 410b of detected event 110a is source IP address —205.252.48.163. In the present example, ruleset 152 comprises a rule to assign to each detected event 110 an attribute value 420a equal to the decimal time of that detected event 110. Based on this rule, correlation engine 140 assigns to detected event 110a attribute value 420a of 17.42—the decimal form of 5:25 p.m. Ruleset 152 also comprises a rule to assign to each detected event 110 an attribute value 420b equal to the base ten form of the source IP address of that detected event 110. Based on this rule, correlation engine 140 assigns to detected event 110a attribute value 420b of 3455856803—the base ten form of 205.252.48.163.

It will be understood that correlation engine 140 may assign any number of attribute values 420 to a particular detected event 110. In particular, correlation engine 140 may assign attributes values 420 that correspond to attributes 410 such as, for example, type of device that generated detected event 110, payload of detected event 110, type of code in detected event 110, day of week of detected event 110, or any other suitable attribute 410 of detected event 110.

According to certain embodiments, correlation engine 140 stores each detected event 110 in detected event storage 158 according to attribute values 420 of that detected event 110. Detected event storage 158 refers to a portion or portions of memory module 150 used to store detected events 110 according to attribute values 420 assigned by correlation engine 140. Although FIG. 2 depicts detected event storage 158 as a portion of memory module 150, detected event storage 158 may reside externally to memory module 150 or at any other location or locations accessible by global server 40 or other components of system 10.

Figures 3, 4:
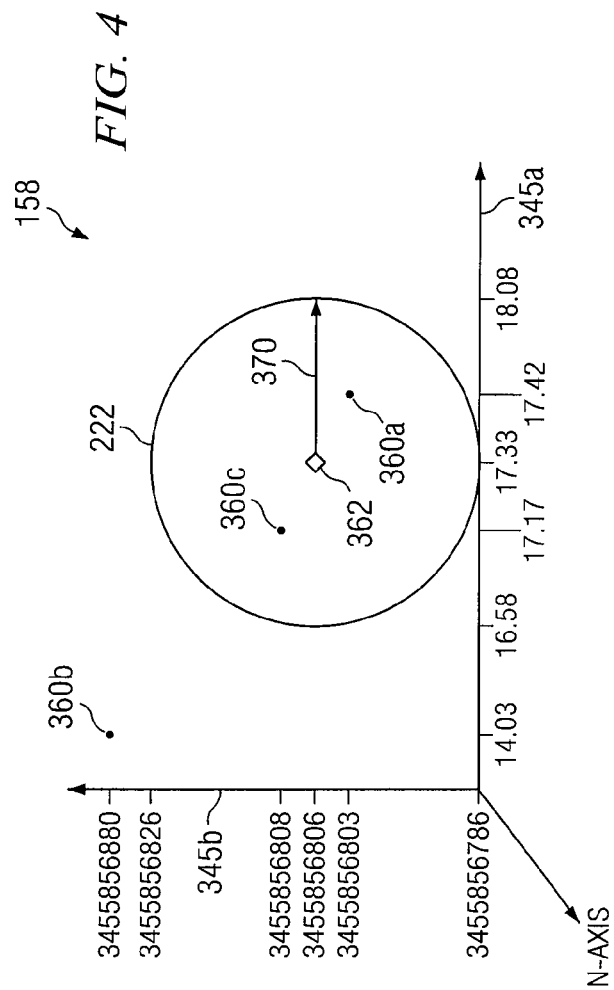
FIG. 3 illustrates a table of event information according to one embodiment of the present invention.
FIG. 4 illustrates stored event information according to one embodiment of the present invention.

Referring to FIG. 4, attribute values 420 of each detected event 110 define a point 360 in n-dimensional space in detected event storage 158. In the preceding example, correlation engine 140 assigned to detected event 110a attribute value 420a of 17.42—corresponding to decimal time of detected event 110a—and attribute value 420b of 3455856803—corresponding to base ten source IP address of detected event 110a. In an n-dimensional space with a first axis 345a representing decimal time and a second axis 345b representing base ten source IP address, attribute values 420a and 420b of detected event 110a define a point 360a at coordinates 17.42 and 3455856803, respectively. Because correlation engine 140 may assign any number of attribute values 420 to detected events 110, there may be any number of axes 345 in n-dimensional space, each axis 345 corresponding to a particular class of attribute values 420 of detected events 110.

Referring back to FIG. 2, correlation engine 140 is operable to correlate detected events 110 in detected event storage 158 to detect an attack occurring upon or within the enterprise. Correlation engine 140 is further operable to determine the likely identity of an attacker. According to certain embodiments, correlation engine 140 correlates detected events 110 using a target event 364 and proximity limits 370. Target event 364 is an event selected or defined by operator 60 to serve as the basis for correlating detected events 110 in detected event storage 158. Target event 364 comprises one or more attributes 410 such as, for example, time, source IP address, and destination IP address. According to certain embodiments, operator 60 selects a particular detected event 110 displayed on GUI 52 to serve as target event 364. In other embodiments, operator 60 may arbitrarily define target event 364 by inputting into console 50 attributes 410 of target event 364. Correlation engine 140 assigns to target event 364 attribute values 420 corresponding to attributes 410 of target event 364. Correlation engine 140 determines attribute values 420 of target event 364 based on rules stored in ruleset 152.

An example illustrates certain embodiments of the present invention. Global server 40 receives detected event 110d, which occurred at 5:20 p.m. and originated from source IP address 205.252.48.166. Detected event 110d comprises a section of code indicating that detected event 110d is an attack. GUI 52 displays detected event 110d to operator 60. While investigating this attack, operator 60 wants to determine whether any other detected events 110 in detected event storage 158 are similar to detected event 110d. Accordingly, operator 60 uses console 50 to select detected event 110d to be target event 364. Console 50 sends target event 364 to global server 40. Correlation engine 140 processes target event 364 by assigning attribute values 420 to target event 364 in accordance with ruleset 152. In the present example, ruleset 152 comprises a rule to assign attribute value 420a equal to the decimal time of target event 364. Accordingly, correlation engine 140 assigns to target event 364 attribute value 420a of 17.33. Ruleset 152 also comprises a rule to assign to target event 364 attribute value 420b equal to base ten source IP address. Accordingly, correlation engine 140 assigns to target event 364 attribute value 420b of 3455856806.

Operator 60 may select a particular detected event 110d to be target event 364 for various reasons. For example, operator 60 may know or suspect that a particular detected event 110 is an attack on internal network 70. By designating that detected event 110 as target event 364, system 10 may correlate other detected events 110 in detected event storage 158 with the attack—that is, target event 364. System 10 may thereby identify certain detected events 110 in detected event storage 158 that are similar to the attack. By identifying other detected events 110 in detected event storage 158 that are similar to the attack, operator 60 may be better able to identify the attacker and thereby preempt future attacks.

In some embodiments, it is not necessary for operator 60 to select a particular detected event 110 to be target event 364. Operator 60 may arbitrarily define target event 364. For example, operator 60 may know from an external source that an attacker typically attacks around 3:00 p.m. using source IP address 205.252.48.166. Operator 60 may use this information to arbitrarily define attributes 410 of target event 364. Accordingly, operator 60 may input into console 50 3:00 p.m. as the time of target event 364 and 205.252.48.166 as the source IP address of target event 364. Console 50 then sends target event 364 to global server 40.

Referring to FIG. 4, attribute values 420 of target event 364 define target point 362 in n-dimensional space. Target point 362 is the base point used by correlation engine 140 in correlating detected events 110 in detected event storage 158. Attribute values 420 of detected events 110 in detected event storage 158 define points 360 in n-dimensional space. According to certain embodiments, the similarity between target event 364 and detected event 110 in detected event storage 158 corresponds to the distance between target point 362 and point 360 defined by attribute values 420 of detected event 110.

In addition to using target event 364, correlation engine 140 uses proximity limits 370 to correlate detected events 110 in detected event storage 158. Proximity limits 370 are numerical values corresponding to particular attributes 410 of target event 364. Proximity limits 370 define a portion of n-dimensional space surrounding target point 362. Referring back to FIG. 2, once operator 60 inputs target event 364 into console 50, GUI 52 requests operator 60 to input proximity limits 370. Once operator 60 inputs proximity limits 370 into console 50, console 50 sends proximity limits 370 to global server 40. Correlation engine 140 receives target event 364 and proximity limits 370 and assigns attribute values 420 to target event 364 and proximity limits 370 based on ruleset 152. Attribute values 420 of target event 364 define target point 362 in n-dimensional space. Generally, correlation engine 140 uses proximity limits 370 to identify a portion of n-dimensional space surrounding target point 362. Proximity limits 370 define the boundaries of that portion of n-dimensional space surrounding target point 362. Correlation engine 140 then identifies certain points 360 that are within that portion of n-dimensional space defined by proximity limits 370. These points 360 identified by correlation engine 140 correspond to certain detected events 110 referred to as identified detected events 222. Generally, identified detected events 222 are similar to target event 364 because identified detected events 222 correspond to points 360 that are within the range of attribute values 420 defined by proximity limits 370.

FIG. 3 illustrates a table comprising event information according to certain embodiments of the present invention. According to the example illustrated in FIG. 3, sensors 20 receive three detected events 110a, 110b, and 110c. Event 110a occurred at 5:25 p.m. and originated from source IP address 205.252.48.163. Event 110b occurred at 2:02 p.m. and originated from source IP address 205.252.48.240. Event 110c occurred at 5:10 p.m. and originated from source IP address 205.252.48.168. Ruleset 152 comprises a rule to assign attribute value 420a equal to the decimal time of detected event 110. Accordingly, correlation engine 140 assigns to detected events 110a, 110b, and 110c attribute values 420a of 17.42, 14.03, and 17.17, respectively. Ruleset 152 comprises another rule to assign attribute value 420b equal to the base ten source IP address of detected event 110. Accordingly, correlation engine 140 assigns to detected events 110a, 110b, and 110c attribute values 420b of 3455856803, 3455856880, and 3455856808, respectively. Correlation engine 140 stores detected events 110a, 110b, and 110c in detected event storage 158 in accordance with attribute values 420 assigned by correlation engine 140.

In the present example, operator 60 learns from an external source that an attack on internal network 70 occurred at 5:20 p.m. from source IP addresses 205.252.48.166. Operator 60 wants to determine whether there are detected events 110 in detected event storage 158 that are similar to that attack. Accordingly, operator 60 inputs that attack into console 50 as target event 364. In particular, operator 60 inputs 5:20 p.m. as the time of target event 364 and 205.252.48.166 as the source IP address of target event 364. Console 50 sends target event 364 to global server 40. Based on a rule in ruleset 152, correlation engine 140 assigns to target event 364 attribute value 420a of 17.33—the decimal form of 5:20 p.m. Based on another rule in ruleset 152, correlation engine 140 assigns to target event 364 attribute value 420b of 3455856806—the base ten source IP address of target event 364.

In the present example, operator 60 specifically wants to identify detected events 110 in detected event storage 158 that originated within forty-five minutes and twenty IP address units of target event 364. Accordingly, operator 60 inputs into console 50 proximity limit 370a of forty-five minutes and proximity limit 370b of twenty address units. Console 50 sends proximity limits 370 to global server 40. Based on a rule in ruleset 152, correlation engine 140 assigns to proximity limit 370a attribute value 420a of 0.75—the decimal form of forty-five minutes. Based on another rule in ruleset 152, correlation engine 140 assigns to proximity limit 370b attribute value 420b of 20—the base ten form of twenty address units.

In the present example, attribute values 420 of target event 364 define target point 362 in n-dimensional space. Target point 362 has coordinates of 17.33 and 3455856806. Based on target point 362 and proximity limits 370, correlation engine 140 identifies those detected events 110 in detected event storage 158 within proximity limits 370 of target point 362. In particular, correlation engine 140 identifies a portion of n-dimensional space surrounding target point 362 defined by decimal time of 17.33 and base ten source IP address of 3455856806. The boundaries of that portion of n-dimensional space are defined by proximity limits 370—that is, within 0.75 hours of 17.33 and within twenty units of 3455856806.

FIG. 4 illustrates stored event information according to the present example. In this example, first axis 345a corresponds to attribute value 420a of decimal time. Second axis 345b corresponds to attribute value 420b of base ten source IP address. Attribute values 420 of detected event 110a define point 360a in n-dimensional space at coordinates 17.42 and 3455856803, respectively. Attribute values 420 of detected event 110b define point 360b in n-dimensional space at coordinates 14.03 and 3455856880, respectively. Attribute values 420 of detected event 110c define point 360c in n-dimensional space at coordinates 17.17 and 3455856808, respectively. Attribute values 420 of target event 364 define a target point 362 in n-dimensional space at 17.33 and 3455856806, respectively. The similarity between target event 364 and detected events 110 corresponds to the distance between target point 362 and points 360 defined by attribute values 420 of detected events 110.

In the present example, proximity limits 370—0.75 decimal time and twenty IP address units—define a portion of n-dimensional space surrounding target point 362. Correlation engine 140 identifies points 360 within the portion of n-dimensional space defined by proximity limits 370. In the present example, points 360a and 360c—corresponding to detected events 110a and 110c, respectively—are within proximity limits 370 of target point 362. Point 360b corresponding to detected event 110b, however, is not within proximity limits 370 of target point 362. Accordingly, correlation engine 140 identifies points 360a and 360c—corresponding to detected events 110a and 110c—as within proximity limits 370 of target point 362. Global server 40 sends to console 50 detected events 110a and 110c as identified detected events 222. GUI 52 displays identified detected events 222 to operator 60. Operator 60 thus learns which detected events 110 in detected event storage 158 are within proximity limits 370 of target event 364. By identifying detected events 110 that are similar to the attack represented by target event 364, operator 60 may be better able to prevent future attacks.

Referring back to FIG. 2, the present invention is operable to determine the likely identity of an attacker by correlating identified detected events 222 with one or more existing attacker profiles 224a stored in profile set 156. If identified detected events 222 do not correlate with one or more existing attacker profiles 224a, correlation engine 140 is operable to generate a new attacker profile 224b based on the event information of identified detected events 222. Each existing attacker profile 224a comprises a plurality of characteristics of an attacker of an enterprise's computer network. In certain embodiments, existing attacker profile 224a includes name and background information such as, for example, last known residence or last known employer. For example, a particular existing attacker profile 224a may correspond to an individual who typically launches attacks between 5:00 p.m. and 5:30 p.m. using external computers with IP addresses between 205.252.48.160 and 205.252.48.200. These characteristics are included in existing attacker profile 224a for this individual. By determining the identity of an attacker, operator 60 may be able to preempt future attacks.

According to certain embodiments, memory module 150 comprises profile set 156. Profile set 156 refers to one or more portions of memory module 150 used for storing attacker profiles 224. According to certain embodiments, correlation engine 140 identifies one or more existing attacker profiles 224a in profile set 156 that have characteristics that match or are similar to attributes 410 of identified detected events 222. Generally, correlation engine 140 determines identified detected events 222 by identifying detected events 110 in detected event storage 158 corresponding to points 360 that are within proximity limits 370 of target point 362. Correlation engine 140 then correlates identified detected events 222 with one or more existing attacker profiles 224a in profile set 156. In particular, correlation engine 140 may identify the particular existing attacker profile 224a in profile set 156 that most closely matches identified detected events 222. Global server 40 sends the identified existing attacker profile 224a to console 50 as identified attacker profile 230. GUI 52 displays identified attacker profile 230 to operator 60. Operator 60 thus learns the likely identity of the individual or organization that caused identified detected events 222.

According to certain embodiments, global server 40 comprises probability module 170 communicatively coupled with correlation engine 140 and/or memory module 150. Probability module 170 comprises one or more Bayesian or neural networks. Probability module 170 may comprise processors, memory, logic, algorithms, directives, or data for implementing statistical methods for calculating conditional or other probabilities. In certain embodiments, correlation engine 140 uses probability module 170 to correlate identified detected events 222 with existing attacker profiles 224a in profile set 156. Probability module 170 may be combined with correlation engine 140 or may be located at any other location or locations accessible by global server 40 or other components of system 10.

An example illustrates certain embodiments of the present invention. Referring to FIG. 4, correlation engine 140 determines identified detected events 222. Identified detected events 222 comprise detected event 110a and detected event 110c. As illustrated in FIG. 3, detected event 110a occurred at 5:25 p.m. and originated from source IP address 205.252.48.163. Detected event 110c occurred at 5:10 p.m. and originated from source IP address 205.252.48.168. Using probability module 170, correlation engine 140 attempts to correlate identified detected events 222 with one or more existing attacker profiles 224a stored in profile set 156.

In the present example, profile set 156 comprises several existing attacker profiles 224a for known attackers of enterprise computer networks. Existing attacker profile $224a_1$ in profile set 156 is for an attacker who typically attacks between 5:00 p.m. and 5:30 p.m. from source IP addresses between 205.252.48.160 and 205.252.48.200. Existing attacker profile $224a_2$ in profile set 156 is for an attacker who typically attacks between 2:00 p.m. and 4:00 p.m. from source IP addresses between 190.165.20.100 and 190.165.20.200. Because detected events 110a and 110c in identified detected events 222 both occurred between 5:00 p.m. and 5:30 p.m. and originated from source IP addresses between 205.252.48.160 and 205.252.48.200, existing attacker profile $224a_1$ most closely matches identified detected events 222. Accordingly, correlation engine 140 correlates identified detected events 222 with existing attacker profile $224a_1$. Global server 40 sends existing attacker profile $224a_1$ to console 50 as identified attacker profile 230. GUI 52 displays to operator 60 existing attacker profile $224a_1$, which comprises the name and certain background information of an individual known to attack enterprise computer networks. Operator 60 thus learns the likely identity of the individual who caused detected events 110a and 110c in identified detected events 222. By knowing the identity of this individual, operator 60 may be better able to preempt future attacks. Operator 60 may take steps such as, for example, blocking access from certain IP addresses or reporting this individual to law enforcement authorities.

According to certain embodiments, correlation engine 140 may be unable to correlate identified detected events 222 with one or more existing attacker profiles 224a in profile set 156. In particular, there may be no existing attacker profile 224a in profile set 156 that matches attributes 410 of identified detected events 222. If identified detected events 222 do not correlate with a particular existing attacker profile 224a, correlation engine 140 is operable to generate new attacker profile 224b based on attributes 410 of identified detected events 222. Correlation engine 140 is further operable to store new attacker profile 224b in profile set 156.

An example illustrates certain embodiments of the present invention. Correlation engine 140 determines identified detected events 222 comprising detected event 110a and detected event 110c. As illustrated in FIG. 3, detected event 110a occurred at 5:25 p.m. and originated from source IP address 205.252.48.163. Detected event 110c occurred at 5:10 p.m. and originated from source IP address 205.252.48.166. Using probability module 170, correlation engine 140 attempts to correlate identified detected events 222 with one or more existing attacker profiles 224a stored in profile set 156. In the present example, profile set 156 does not comprise a particular existing attacker profile 224a that matches attributes 410 of identified detected events 222. Correlation engine 140 is therefore unable to correlate identified detected events 222 with any existing attacker profiles 224a. Consequently, correlation engine 140 generates new attacker profile 224b based on attributes 410 of identified detected events 222. In the present example, correlation engine 140 generates a new attacker profile 224b of an attacker who typically attacks between 5:00 p.m. and 5:30 p.m. and who typically uses source IP addresses between 205.252.48.160 and 205.252.48.170. Correlation engine 140 stores new attacker profile 224b in profile set 156. In addition, global server 40 sends new attacker profile 224b to console 50 as identified attacker profile 230. GUI 52 displays new attacker profile 224b to operator 60. According to certain embodiments, GUI 52 may display to operator 60 that the identity of the attacker associated with new attacker profile 224b is unknown. However, operator 60 may track the unknown attacker associated with new attacker profile 224b by monitoring those detected events 110 thereafter received by sensors 20 that match new attacker profile 224b. According to certain embodiments, if operator 60 later learns the identify of the attacker associated with new attacker profile 224b, operator 60 may request console 50 to recall new attacker profile 224b. Operator 60 may then input into console 50 the name and background information of that attacker associated with new attacker profile 224b. Global server 40 may store in profile set 156 the name and background information of that attacker in association with new attacker profile 224b.

The present invention may be implemented in various enterprise computer networks. In particular, system 10 may be a military information system such as, for example, a military information system used to track supply levels of several battalions. In the present example, operator 60 is a military supply officer. Global server 40 receives detected event 110e, which occurred at 5:25 p.m. and originated from a UNIX-based computer. Ruleset 152 comprises a rule to assign attribute value 420a equal to the decimal time of detected event 110. Accordingly, correlation engine 140 assigns detected event 110e attribute value 420a of 17.42. Ruleset 152 also comprises a rule to assign attribute value 420d of three to detected events 110 that originate from UNIX-based computers. Correlation engine 140 therefore assigns attribute value 420d of three to detected event 110e. Correlation engine 140 stores detected event 110e in detected event storage 158 in accordance with the attribute values 420 of detected event 110e.

In the present example, an enemy attacker attempts to hack into system 10 to obtain sensitive information about supply levels tracked by system 10. System 10 detects this attack as detected event 110f, which occurred at 5:20 p.m. and originated from a UNIX-based computer. Detected event 110f contains a segment of code signifying that detected event 110f is an attack. Operator 60 of system 10 wants to determine whether any detected events 110 in detected event storage 158 may be related to this attack. In particular, operator 60 wants to identify detected events 110 in detected event storage 158 that occurred within forty-five minutes of 5:20 p.m. and that originated from UNIX-based computers. Accordingly, operator 60 selects detected event 110f as target event 364. Console 50 sends target event 364 to global server 40. Operator 60 enters "forty-five minutes" into console 50 as proximity limit 370a. Operator 60 enters "Unix-based computer" into console 50 as proximity limit 370d.

In the present example, correlation engine 140 assigns attribute values 420 to target event 364 based on rules in ruleset 152. Accordingly, correlation engine 140 assigns target event 364 attribute value 420a of 17.33—the decimal form of 5:20 p.m. Correlation engine 140 assigns target event 364 attribute value 420d of three because target event 364 originated from a UNIX-based computer. Based on rules in ruleset 152, correlation engine 140 also assigns attribute values 420 to proximity limits 370. Proximity limit 370a corresponding to forty-five minutes is assigned an attribute value 420a of 0.75. Proximity limit 370d corresponding to the type of computer is assigned an attribute value 420d of three.

In the present example, correlation engine 140 identifies detected events 110 in detected event storage 158 that correspond to points 360 that are within proximity limits 370 of target point 362. In particular, correlation engine 140 identifies first detected event 110e that occurred at 5:25 p.m. and that originated from a UNIX-based computer. In the present example, detected event 110e occurred within forty-five minutes of target event 364 and originated from a UNIX-based computer. Correlation engine 140 identifies detected event 110e as identified detected event 222. Correlation engine 140 then attempts to correlate identified detected event 222 with one or more existing attacker profiles 224a in profile set 156. In the present example, profile set 156 comprises an existing attacker profile $224a_3$ for an attacker known to typically attack between 5:00 p.m. and 5:30 p.m. from UNIX-based computers. Because existing attacker profile $224a_3$ matches attributes 410 of identified detected event 222, correlation engine 140 correlates identified detected event 222 with existing attacker profile $224a_3$. Global server 40 sends existing attacker profile $224a_3$ to console 50 as identified attacker profile 230. GUI 52 displays existing attacker profile $224a_3$ to operator 60. Operator 60 thus learns the identity of the individual or organization that likely caused identified detected event 222.

The foregoing example illustrates a military information system that incorporates the present invention to detect an attack on a system and to correlate event information regarding the attack. The present invention may also be used to detect and correlate events other than attacks. For example, system 10 may be configured to detect and correlate information regarding supply levels of military units, movements of troops, maintenance of vehicles, conditions of weapons, or any other suitable type of event or information.

The present invention has several important technical advantages. Various embodiments of the invention may have none, some, or all of these advantages. According to certain embodiments, the present invention reduces the number of operations required to correlate certain detected events 110 with other detected events 110 in detected event storage 158, thus resulting in faster correlations. According to certain embodiments, the present invention enables correlation of detected events 110 with the identity of an attacker. By identifying the attacker, operator 60 is better able to respond to an attack, preempt future attacks, and gather evidence against the attacker.

Figure 5:
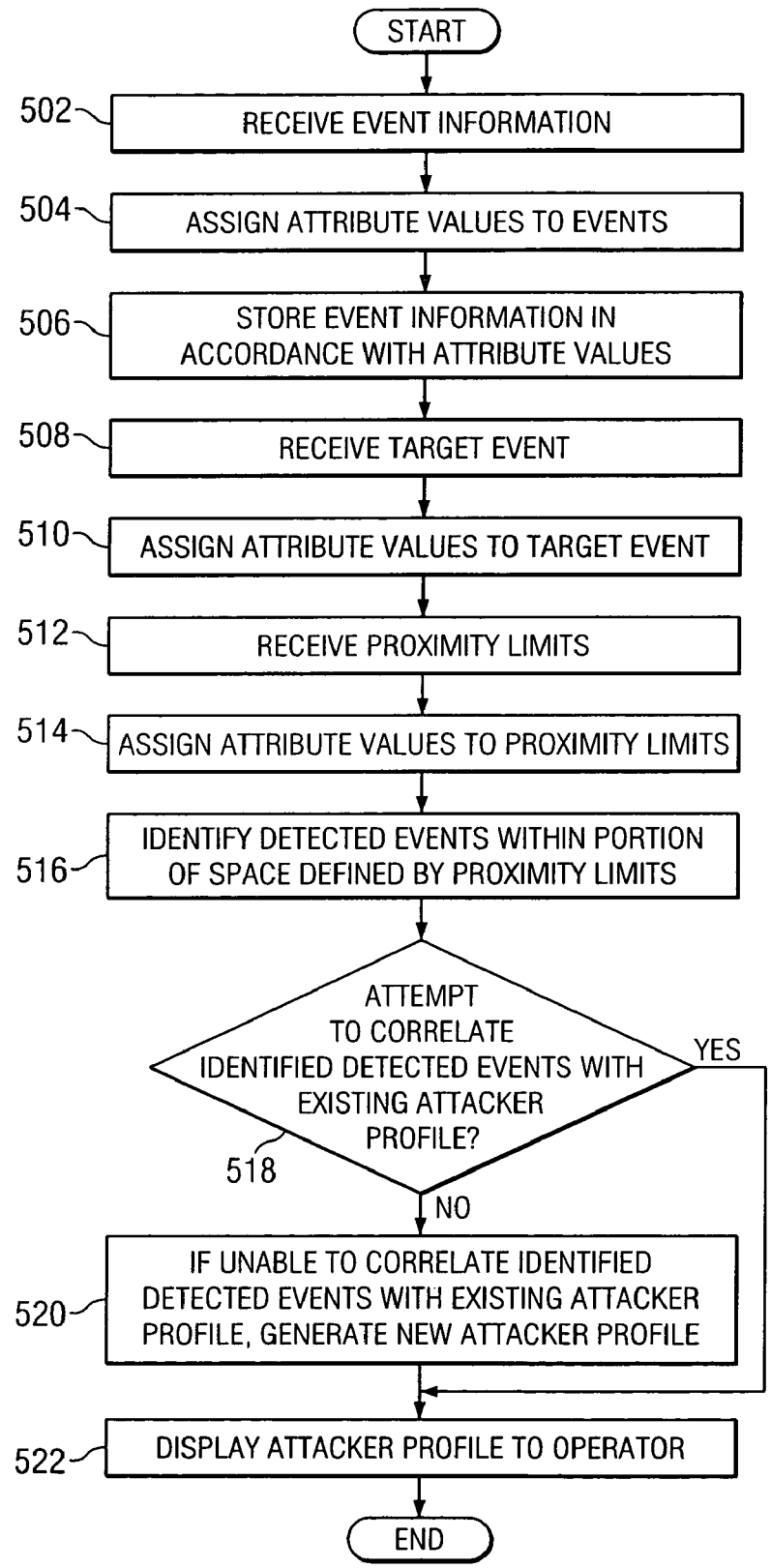
FIG. 5 illustrates a flow chart for correlating event information according to one embodiment of the present invention.

FIG. 5 illustrates a flow of operation according to one embodiment of the present invention. The method begins at step 502 where intrusion detection system 10 receives detected events 110. Each detected event 110 comprises a plurality of attributes 410 such as, for example, time, source IF address, and destination IP address. At step 504, correlation engine 140 assigns attribute values 420 to detected events 110 based on rules in ruleset 152. Attribute values 420 of each detected event 110 define a point 360 in n-dimensional space. At step 506, correlation engine 140 stores detected events 110 in detected event storage 158 according to attribute values 420 assigned by correlation engine 140. At step 508, correlation engine 140 receives target event 364. Target event 364 comprises a plurality of attributes 410 such as, for example, time, source IP address, and destination IP address. At step 510, correlation engine 140 assigns to target event 364 attribute values 420 based on rules in ruleset 152. Attribute values 420 of target event 364 define target point 362 in n-dimensional space. At step 512, correlation engine 140 receives proximity limits 370. Proximity limits 370 define a portion of n-dimensional space surrounding target point 362. At step 514, correlation engine 140 assigns attribute values 420 to proximity limits 370. At step 516, correlation engine 140 identifies those particular detected events 110 in detected event storage 158 corresponding to points 360 that are within proximity limits 370 of target point 362. Those particular detected events 110 identified by correlation engine 140 are referred to as identified detected events 222. At step 518, correlation engine 140 attempts to correlate identified detected events 222 with at least one existing attacker profile 224a in profile set 156. Existing attacker profile 224a comprises characteristics of a known attacker of enterprise computer networks. If correlation engine 140 is able to correlate identified detected events 222 with at least one existing attacker profile 224a, GUI 52 displays that existing attacker profile 224a to operator 60 at step 522. If correlation engine 140 is unable to correlate identified detected events 222 with at least one existing attacker profile 224a, correlation engine 140 generates new attacker profile 224b at step 520. New attacker profile 224b, which is based on identified detected events 222, is stored with identified detected events 222 in profile set 156 at step 518. At step 522, system 10 displays existing attacker profile 224a or new attacker profile 224b to operator 60.

As discussed above with respect to FIGS. 2-5, system 10 is operable to correlate detected events 110 based on attribute values 420 and to detect attacks on an enterprise system and to determine the likely identity of an attacker. System 10 is further operable to receive queries based on particular attributes 410 and/or attribute values 420 of detected events 110. By caching queries and/or event information in memory module 150, system 10 may efficiently respond to queries submitted by operator 60. The caching of queries and event information is discussed below with respect to FIGS. 6-10.

Figure 6:
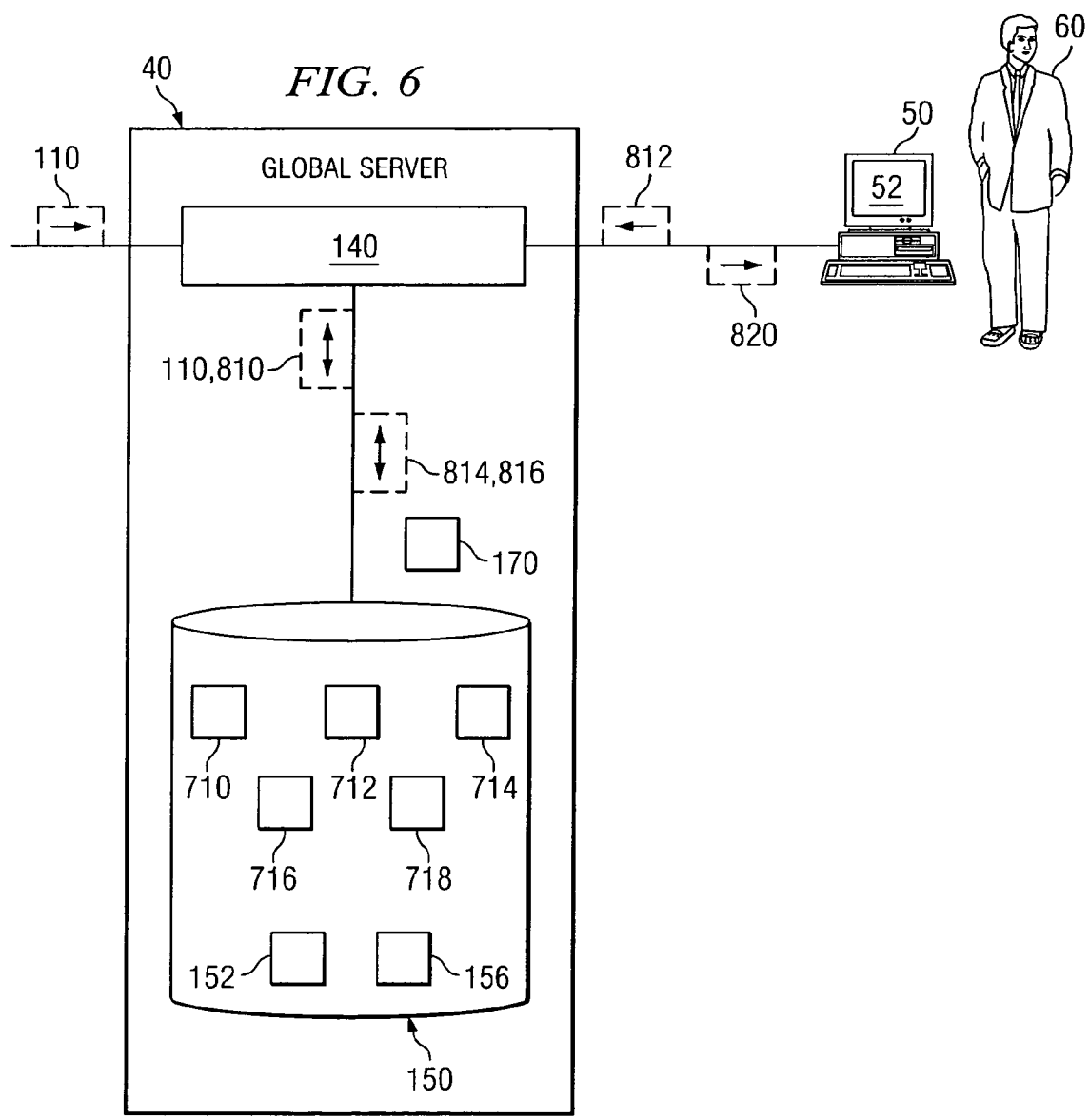
FIG. 6 illustrates a console and global server according to certain embodiments of the present invention.

FIG. 6 illustrates one embodiment of console 50 and global server 40. Global server 40 may comprise correlation engine 140 and memory module 150. According to certain embodiments, memory module 150 comprises tables for storing event information associated with detected events 110. Correlation engine 140 is operable to process queries 812 from operator 60 to correlate and/or retrieve event information associated with detected events 110 stored in tables in memory module 150. Correlation engine 140 is further operable to aggregate, index, and cache data in memory module 150 to minimize the processing time for responding to queries 812 submitted by operator 60.

According to certain embodiments, console 50 may receive from operator 60 one or more queries 812. A particular query 812 is generally a command to search, aggregate, correlate, scan, and/or retrieve data stored in memory module 150. A particular query 812 may be based on attributes 410 of detected events 110, attribute values 420 of detected events 110, attacker profiles 224, any other characteristic or combination of characteristics associated with detected events 110. For example, query 812 may be a request for all detected events 110 in event table 710 having a particular source IP address. In general, a particular query 812 may be a combination of multiple subqueries 814. Subquery 814 refers to a search request that is combined with other search requests as part of a complex search for data stored in memory module 150. Subqueries 814 are illustrated below.

According to certain embodiments, operator 60 may submit query 812 to system 10 using console 50. Console 50 may forward query 812 to global server 40. If query 812 consists of multiple subqueries 814, correlation engine 140 may parse query 812 into subqueries 814. Correlation engine 140 generally executes each subquery 814 by scanning tables of data stored in memory module 150. Correlation engine 140 is operable to merge the results of subqueries 814 into a unified set of results for query 812. System 10 may display on GUI 52 the results of query 812.

An example illustrates certain embodiments of the present invention. Operator 60 submits to console 50 a particular query 812 for all detected events 110 having a source IP address of 3.4.5.1 and a destination port of 80. System 10 parses query 812 into two subqueries 814. One subquery 814 is for detected events 110 having a source IP address of 3.4.5.1. The other subquery 814 is for detected events 110 having a destination port of 80. System 10 may execute each subquery 814, merge the results of each subquery 814, and display on GUI 52 the results of query 812 to operator 60.

To minimize processing time for executing queries 812, memory module 150 may comprise multiple tables for storing data associated with system 10. In particular, memory module 150 may store an event table 710, a correlation update table 712, a correlation results table 714, an attribute value update table 716, and an attribute value table 718.

Event table 710 generally stores each detected event 110 received by system 10. Each detected event 110 may comprise an event identifier 810 assigned by correlation engine 140. Event identifier 810 may be one or more numbers, letters, symbols, or other suitable means for identifying a particular detected event 110. Each detected event 110 may comprise event information such as, for example, source IP address, source port, destination IP address, destination port, and time. Correlation engine 140 may store in event table 710 the particular event identifier 810 and the event information associated with each detected event 110. Detected events 110 may be stored in event table 710 according to type, time, or any other suitable characteristic of detected event 110.

Memory module 150 may also comprise correlation update table 712. Correlation update table 712 is generally used to keep track of subqueries 814 submitted to system 10. When a subquery 814 is submitted for the first time to system 10, correlation engine 140 may assign a subquery identifier 816 to that subquery 814. Subquery identifier 816 may be one or more numbers, letters, symbols, or other suitable means for identifying a particular subquery 814. Correlation engine 140 may store a particular subquery 814 and the associated subquery identifier 816 in correlation update table 712. Correlation update table 712 may also store a correlation update time 818 for each subquery 814. When correlation engine 140 executes a particular subquery 814, correlation engine 140 may set the correlation update time 818 for that subquery 814 to be the time of the last detected event 110 in event table 710. In other embodiments, correlation engine 140 may set the correlation update time 818 for that subquery 814 to be the time at which that subquery 814 was last executed. Each time correlation engine 140 executes a particular subquery 814, correlation engine 140 may update the correlation update time 818 for that subquery 814 in correlation update table 712. Therefore, upon receiving a particular subquery 814 from console 50, correlation engine 140 may scan correlation update table 712 to determine whether that subquery 814 has been previously submitted and, if so, the particular subquery identifier 816 and correlation update time 818 associated with that subquery 814. If correlation engine 140 determines that the particular subquery 814 has not been previously submitted, correlation engine 140 may assign a new subquery identifier 816 to that subquery 814. According to certain embodiments, correlation update time 818 may be referred to as "subquery update time" or "query update time."

In addition to correlation update table 712, memory module 150 may store correlation results table 714. Correlation engine 140 generally stores the results of a particular subquery 814 in correlation results table 714. In particular, for each subquery 814, correlation results table 714 may store the corresponding subquery identifier 816 as well as the particular event identifiers 810 associated with detected events 110 that satisfy that subquery 814. Correlation results table 714 may comprise a separate entry for each detected event 110 that satisfies a particular subquery 814.

FIG. 7 illustrates an example of event table 710 according to certain embodiments of the present invention. In this example, sensor 20 receives a particular detected event 110 at 2:37:45 GMT on Jul. 8, 2005 with a source IP address of 2.4.6.2, a destination IP address of 5.4.3.2, and a destination port of 64. Correlation engine 140 assigns "$110_1$" as event identifier 810 for detected event 110. Correlation engine 140 stores in event table 710 the assigned event identifier 810 and the event information associated with detected event $110_1$. Subsequently, system 10 receives additional detected events 110. As illustrated in FIG. 7, each detected event 110 is assigned a particular event identifier 810 and stored in event table 710.

FIGS. 8*a* and 8*b* illustrate examples of correlation update table 712 and correlation results table 714, respectively. In the present example, operator 60 submits to console 50 a particular query 812 to identify detected events 110 in event table 710 having a source IP address of 3.4.5.1 and a destination port of 80. Correlation engine 140 parses query 812 into two subqueries 814—(a) to identify detected events 110 having a source IP address of 3.4.5.1 and (b) to identify detected events 110 having a destination port of 80. Correlation engine 140 scans correlation update table 712 to determine whether either subquery 814 has been submitted previously. In the present example, both subqueries 814 are new. Accordingly, correlation engine 140 assigns subquery identifiers 816 to each subquery 814. For the particular subquery 814 to identify detected events 110 having a source IP address of 3.4.5.1, system 10 assigns "$814_1$" as subquery identifier 816. For the particular subquery 814 to identify detected events 110 having a destination port of 80, correlation engine 140 assigns "$814_2$" as subquery identifier 816. Correlation engine 140 stores subqueries $814_1$ and $814_2$ in correlation update table 712. Correlation engine 140 sets correlation update time 818 in correlation update table 712 as 16:58:31 GMT on Jul. 16, 2005—the time of the last detected event 110 in event table 710 illustrated in FIG. 7.

In the present example, correlation engine 140 executes subquery $814_1$ by scanning event table 710 illustrated in FIG. 7. Correlation engine 140 determines that detected events $110_2$ and $110_4$ have source IP addresses of 3.4.5.1. Accordingly, in correlation results table 714 illustrated in FIG. 8*b*, correlation engine 140 stores "$814_1$" (i.e., subquery identifier 816 of subquery $814_1$) in association with "$110_2$" (i.e., event identifier 810 of detected event $110_2$). As another entry in correlation results table 714, correlation engine 140 stores "$814_1$" in association with "$110_4$" (i.e., event identifier 810 of detected event $110_4$). Correlation engine 140 then executes subquery $814_2$ by scanning event table 710. System 10 determines that detected events $110_2$ and $110_3$ have a destination port of 80. Accordingly, in correlation results table 714 illustrated in FIG. 8*b*, correlation engine 140 stores "$814_2$" in association with "$110_2$". As another entry in correlation results table 714, correlation engine 140 stores "$814_2$" in association with "$110_3$". Correlation engine 140 merges the results of subqueries $814_1$ and $814_2$ and determines that detected event $110_2$ is the only detected event 110 in event table 710 that satisfies the particular query 812 submitted by operator 60. Accordingly, system 10 displays on GUI 52 as query results 820 the event information associated with detected event $110_2$.

In the foregoing example, correlation engine 140 caches the results of subqueries $814_1$ and $814_2$ in correlation results table 714. Consequently, the next time operator 60 submits a particular query 812 comprising either subquery $814_1$ or subquery $814_2$, correlation engine 140 may use correlation results table 714 to determine the results of subqueries 814 for detected events 110 received prior to correlation update time 818. By caching results in correlation results table 714, system 10 may reduce the processing time for executing subqueries $814_1$ and $814_2$ the next time they are submitted by operator 60.

In the foregoing example, query 812 comprises two subqueries 814—namely, $814_1$ and $814_2$. It will be understood, however, that query 812 may comprise only one subquery 814. In other words, query 812 may be a simple query 812 that does not comprise operands such as, for example, "and" or "not". It will also be understood that query 812 may comprise any number and combinations of subqueries 814.

According to certain embodiments, system 10 is operable to execute queries 812 based on attribute values 420 associated with detected events 110. As described above, correlation engine 140 may assign attribute values 420 to each detected event 110 according to the particular attributes 410 of that detected event 110. A particular attribute value 420 is a numerical value that corresponds to a particular attribute 410 of detected event 110. Correlation engine 140 uses rules stored in ruleset 152 to determine which attribute values 420 to assign to a particular detected event 110.

Operator 60 may submit queries 812 based on attribute values 420 as well as attributes 410 of detected events 110. For example, operator 60 may submit to system 10 query 812 to identify detected events 110 that occurred on a particular day of the week. According to certain embodiments, each detected event 110 in event table 710 may be associated with an attribute 410 corresponding to time (e.g., UNIX timestamp, GMT timestamp, etc.). Thus, a raw timestamp may be a particular attribute 410 of each detected event 110. Correlation engine 140 may apply rules in ruleset 152 to the time data associated with a particular detected event 110 to determine the day of the week on which that detected event 110 occurred. For that detected event 110, correlation engine 140 may assign a numerical value representing a particular day of the week. Although the foregoing example illustrates a day of the week as an attribute value 420 of detected event 110, it will be understood that system 10 may assign any number and combination of attribute values 420 to a particular detected event 110.

According to certain embodiments, correlation engine 140 is operable to cache attribute values 420 of detected events 110 to minimize processing time of queries 812. In some embodiments, correlation engine 140 may periodically determine a particular attribute value 420 for some or all of detected events 110 in event table 710. In other embodiments, correlation engine 140 may determine a particular attribute value 420 for detected events 110 in event table 710 when correlation engine 140 receives a particular query 812 based at least in part on that particular attribute value 420.

According to certain embodiments, memory module 150 in global server 40 may comprise an attribute value update table 716 and an attribute value table 718, which are illustrated in FIGS. 9a and 9b, respectively. Attribute value update table 716 is generally used to keep track of when correlation engine 140 last calculated a particular attribute value 420. According to certain embodiments, each attribute value 420 is associated with a rule in ruleset 152, and each rule in ruleset 152 is associated with a rule identifier 822. Rule identifier 822 refers to one or more numbers, letters, symbols, or other suitable means for identifying a rule. Correlation engine 140 stores in attribute value update table 716 rule identifiers 822 for each rule. Correlation engine 140 also stores in attribute value update table 716 an attribute value update time 824 associated with each rule identifier 822. Attribute value update time 824 for a particular rule identifier 822 represents the last time correlation engine 140 applied the particular rule associated with the particular rule identifier 822 to some or all of detected events 110 in event table 710. According to certain embodiments, attribute value update time 824 may be referred to as "rule update time."

FIG. 9b illustrates an example of attribute value table 718 according to certain embodiments. Generally, correlation engine 140 stores in attribute value table 718 attribute values 420 for detected events 110 stored in event table 710. Each entry in attribute value table 718 may comprise a particular attribute value 420 associated with a corresponding rule identifier 822 and a corresponding event identifier 810.

When correlation engine 140 receives query 812 based on a particular attribute value 420, correlation engine 140 may identify the particular rule in ruleset 152 corresponding to that attribute value 420. Correlation engine 140 may also identify the particular rule identifier 822 associated with that rule corresponding to attribute value 420. Correlation engine 140 may then scan attribute value update table 716 to determine attribute value update time 824 associated with the particular rule identifier 822. Then, correlation engine 140 may use the particular rule associated with rule identifier 822 to determine attribute values 420 for each detected event 110 in event table 710 received after attribute value update time 824. Correlation engine 140 may store the determined attribute values 420 in attribute value table 718 in association with the corresponding rule identifier 822 and event identifier 810. Correlation engine 140 may scan attribute value table 718 to determine which event identifiers 810 are associated with attribute values 420 that satisfy query 812. System 10 may then display on GUI 52 as query results 820 the particular detected events 110 associated with the determined event identifiers 810 (i.e., the particular event identifiers 810 associated with attribute values 420 that satisfy query 812). By caching attribute values 420 in attribute value table 718, correlation engine 140 may minimize the processing time for executing queries 812 based on attribute values 420.

An example illustrates certain embodiments of the present invention. Operator 60 submits to system 10 a particular query 812 for detected events 110 that occurred on a Tuesday. Correlation engine 140 determines that query 812 comprises only one subquery 814 (i.e., detected events 810 that occurred on a Tuesday). Correlation engine 140 determines that subquery 814 has not been submitted previously to system 10. Accordingly, correlation engine 140 assigns "$814_3$" as subquery identifier 816 for subquery 814. Correlation engine 140 stores subquery $814_3$ in correlation update table 712, as illustrated in FIG. 8a. Correlation engine 140 determines that subquery $816_3$ is based on a particular attribute value 420 of detected events 110 (i.e., attribute value 420 related to the day of the week). Using ruleset 152, correlation engine 140 determines that "$822_1$" is rule identifier 822 for the rule related to the day of the week. In the present example, this particular rule dictates that detected events 110 occurring on a Sunday be assigned an attribute value 420 of "1", that detected events 110 occurring on a Monday be assigned an attribute value 420 of "2", and so forth. Correlation engine 140 scans attribute value update table 716 to determine attribute value update time 824 associated with rule identifier $822_1$ (i.e., the last time correlation engine 140 determined the day of the week for some or all of detected events 110 in event table 710). In this example, attribute value update time 824 associated with rule identifier $822_1$ is 6:02:02 GMT on Jul. 11, 2005. Accordingly, correlation engine 140 determines that, for detected events 110 received prior to 6:02:02 GMT on Jul. 11, 2005, attribute values 420 associated with rule identifier $822_1$ are cached in attribute value table 718.

In the present example, correlation engine 140 applies the rule associated with rule identifier $822_1$ to detected events 110 received after 6:02:02 GMT on Jul. 11, 2005 to determine a particular attribute value 420 corresponding to the day of week of those detected events 110. Correlation engine 140 stores in attribute value table 718 the determined attribute values 420. Attribute value 420 for a particular detected event 110 is stored in association with rule identifier $822_1$ and with event identifier 810 for that detected event 110. In attribute value update table 716, correlation engine 140 updates attribute value update time 824 associated with rule identifier $822_1$ to be the time of the last detected event 110 in event table 710.

In the present example, correlation engine 140 scans attribute value table 718 illustrated in FIG. 9b to determine event identifiers 810 associated with attribute values 420 that satisfy subquery $816_3$ (i.e., that occurred on a Tuesday). Correlation engine 140 determines that event identifiers $110_{11}$, $110_{12}$, and $110_{13}$ are associated with attribute values 420 that satisfy subquery $816_3$. Correlation engine 140 stores in correlation results table 714 event identifiers $110_{11}$, $110_{12}$, and $110_{13}$ in association with subquery identifier $814_3$. Correlation engine then retrieves from event table 710 the event information associated with $110_{11}$, $110_{12}$, and $110_{13}$. System 10 displays on GUI 52 as query results 820 the retrieved event information associated with $110_{11}$, $110_{12}$, and $110_{13}$.

In the foregoing example, query 812 is a simple query 812 that does not comprise multiple subqueries 814. It will be understood, however, that query 812 may comprise any number and combination of subqueries 814. In the foregoing example, query 812 is based on attribute value 420 associated with "day of week." It will be understood, however, that query 812 may be based on any type and combination of attribute values 420.

The present invention has several important technical advantages. Various embodiments of the invention may have none, some, or all of these advantages. One advantage is that the present invention reduces the number of operations required to correlate detected events 110, resulting in faster correlations. The present invention caches prior queries 812 and results of queries 812, thus reducing the time needed to process queries 812. In addition, the present invention enables an intrusion detection system 10 to determine the likely identity of attackers. By quickly identifying attackers, an operator 60 of an intrusion detection system 10 is better able to respond to attacks, preempt future attacks, and gather evidence against attackers.

FIG. 10 illustrates a flow chart according to certain embodiments of the present invention. The method begins at step 902 wherein system 10 receives a particular query 812 from operator 60. At step 904, correlation engine 140 parses query 812 into one or more subqueries 814. At step 906, correlation engine 140 determines whether the particular subquery 814 has been previously submitted to system 10. Correlation engine 140 may make this determination by scanning correlation update table 712. If correlation engine 140 determines at step 906 that subquery 814 has been previously submitted to system 10, then at step 908 correlation engine 140 may use correlation update table 712 to identify subquery identifier 816 associated with subquery 814. At step 910, correlation engine 140 may use correlation update table 712 to identify a particular correlation update time 818 associated with subquery 814.

If at step 906, correlation engine 140 determines that subquery 814 has not been previously submitted to system 10, then at step 912 correlation engine 140 assigns a particular subquery identifier 816 to subquery 814. At step 914, correlation engine 140 stores subquery 814 and the corresponding subquery identifier 816 in correlation update table 712.

At step 916, correlation engine 140 determines whether subquery 814 is based on a particular attribute value 420. If correlation engine 140 determines that subquery 814 is not based on a particular attribute value 420, then the method proceeds to step 917. However, if at step 916 correlation engine 140 determines that subquery 814 is based on a particular attribute value 420, then the method proceeds to step 918. At step 918, correlation engine 140 uses ruleset 152 to identify a rule associated with attribute value 420 that forms the basis of subquery 814. In addition, correlation engine 140 uses ruleset 152 to determine the particular rule identifier 822 associated with the identified rule in ruleset 152. At step 920, correlation engine 140 scans attribute value update table 716 to determine attribute value update time 824 associated with rule identifier 822. At step 922, correlation engine 140 applies the rule associated with rule identifier 822 to detected events 110 in event table 710 received after attribute value update time 824 in order to determine attribute values 420 of those detected events 110. At step 924, correlation engine 140 stores in attribute value table 718 the determined attribute value 420 of each detected event 110, the corresponding event identifiers 810 of detected events 110, and the corresponding rule identifier 822.

At step 926, correlation engine 140 updates attribute value update time 824 in attribute value update table 716 to be the current time or the time associated with the last detected event 110 in event table 710. At step 928, correlation engine 140 scans attribute value table 718 to identify event identifiers 810 associated with attribute values 420 that satisfy subquery 814. At step 930, correlation engine 140 updates correlation results table 714 to include the identified event identifiers 810 and the corresponding subquery identifier 816. At step 932, correlation engine 140 updates the correlation update time 818 for subquery 814 in correlation update table 712 to be the current time or the time of the last detected event 110 in event table 710. At step 934, correlation engine 140 uses event table 710 to retrieve event information associated with the identified event identifiers 810 that satisfy subquery 814.

If at step 916 correlation engine 140 determines that subquery 814 is not based on a particular attribute value 420, then the method proceeds to step 917. At step 917, correlation engine 140 scans detected events 110 in event table 710 received after correlation update time 818 to identify detected events 110 that satisfy subquery 814. At step 919, correlation engine 140 stores in correlation results table 714 event identifiers 810 associated with detected events 110 identified in step 917. Correlation engine 140 stores in correlation results table 714 event identifiers 810 as well as subquery identifier 816 associated with subquery 814. At step 921, correlation engine 140 scans correlation results table 714 to determine event identifiers 810 corresponding to subquery identifier 816 associated with subquery 814. At step 923, correlation engine 140 retrieves from event table 710 event information associated with detected events 110 corresponding to the determined event identifiers 810.

At step 936, the method is repeated for each subquery 814 associated with query 812 from operator 60. It will be understood that multiple subqueries may be processed serially or in parallel. At step 938, correlation engine 140 merges the results of subqueries 814 that make up query 812 submitted by operator 60. At step 940, system 10 displays on GUI 52 as query results 820 the event information associated with detected events 110 that satisfy query 812.

Although the present invention has been described in detail, it should be understood that various changes, substitutions, and alterations can be made hereto without departing from the scope of the invention as defined by the appended claims.

What is claimed is:

1. A system comprising:
   at least one sensor operable to receive one or more detected events, each detected event associated with at least one data packet in an enterprise network;
   at least one memory module operable to store one or more rules and a plurality of tables;
   at least one processor operable to:
   receive a query associated with an attribute value of a detected event;
   identify a rule for determining the attribute value, the rule associated with a rule identifier;
   identify in a first table a rule update time associated with the rule;
   apply the rule to determine attribute values for a plurality of detected events stored in a second table, wherein:
      the plurality of detected events in the second table occurred after the rule update time such that the rule is applied only to the plurality of detected events occurring after the rule update time and not to any detected events occurring before the rule update time;
      the plurality of detected events are associated with event identifiers; and
      each of the plurality of detected events is associated with a plurality of attribute values, the attribute values of each detected event defining a respective point in n-dimensional space;
   send to a third table the determined attribute values and the event identifiers;
   identify in the third table one or more event identifiers associated with one or more attribute values that satisfy the query;
   display to a user a set of query results, wherein the set of query results include one or more event identifiers associated with detected events occurring after the rule update time and one or more event identifiers associated with a cached query result of at least one detected event occurring prior to the rule update time;
   correlate the target event and one or more similar detected events of the second table, the correlation based at least in part on a distance between the respective points defined by the respective attribute values of the target event and the one or more similar detected events of the second table, wherein the distance between the respective points defined by the respective attribute values of the target event and the one or more similar detected events of the second table are proximate to one another indicating that the target event is similar to the one or more detected events; and
   identify a source of the target event as being the same as the source of the one or more similar detected events based on the correlation.

2. The system of claim 1, wherein the processor is further operable to:
   determine whether the query is stored in a fourth table; and
   if the query is stored in the fourth table, determine a query identifier and a query update time associated with the query, the query identifier and the query update time stored in the fourth table.

3. The system of claim 1, wherein the processor is further operable to:
   determine whether the query is stored in a fourth table; and
   if the query is not stored in the fourth table, assign a query identifier to the query and send the query and the query identifier to the fourth table.

4. The system of claim 1, wherein the processor is further operable to update the rule update time associated with the rule, the rule update time stored in the first table.

5. The system of claim 1, wherein the query is associated with a query identifier, and the processor is further operable to send to a fifth table the identified event identifiers in association with the query identifier.

6. The system of claim 1, wherein the processor is further operable to update a query update time associated with the query, the query update time stored in a fourth table.

7. The system of claim 1, wherein the processor is further operable to retrieve from the second table one or more detected events associated with the identified event identifiers.

8. An apparatus comprising:
   at least one memory module operable to store one or more rules and a plurality of tables;
   at least one processor operable to:
   receive a query associated with an attribute value of a detected event, the detected event associated with at least one data packet in an enterprise network;
   identify a rule for determining the attribute value, the rule associated with a rule identifier;
   identify in a first table a rule update time associated with the rule;
   apply the rule to determine attribute values for a plurality of detected events stored in a second table, wherein:
      the plurality of detected events in the second table occurred after the rule update time such that the rule is applied only to the plurality of detected events occurring after the rule update time and not to any detected events occurring before the rule update time;
      the plurality of detected events are associated with event identifiers; and
      each of the plurality of detected events is associated with a plurality of attribute values, the attribute values of each detected event defining a respective point in n-dimensional space;
   send to a third table the determined attribute values and the event identifiers;
   identify in the third table one or more event identifiers associated with one or more attribute values that satisfy the query;
   display a set of query results to a user, wherein the set of query results include one or more event identifiers associated with detected events occurring after the rule update time and one or more event identifiers associated with a cached query result of at least one detected event occurring prior to the rule update time;
   correlate the target event and one or more similar detected events of the second table, the correlation based at least in part on a distance between the respective points defined by the respective attribute values of the target event and the one or more similar detected events of the second table, wherein the distance between the respective points defined by the respective attribute values of the target event and the one or more similar detected events of the second table are proximate to one another indicating that the target event is similar to the one or more detected events; and
   identify a source of the target event as being the same as the source of the one or more similar detected events based on the correlation.

9. The apparatus of claim 8, wherein the processor is further operable to retrieve from the second table one or more detected events associated with the identified event identifiers.

10. The apparatus of claim 8, wherein the processor is further operable to update the rule update time associated with the rule, the rule update time stored in the first table.

11. The apparatus of claim 8, wherein the query is associated with a query identifier, and the processor is further operable to:
   store in a fifth table the identified event identifiers in association with the query identifier; and
   update a query update time associated with the query, the query update time stored in a fourth table.

12. A method comprising:
   receiving a query associated with an attribute value of a detected event, the detected event associated with at least one data packet in an enterprise network, wherein the query is associated with the attribute value of a target event;
   identifying a rule for determining the attribute value, the rule associated with a rule identifier;
   identifying in a first table a rule update time associated with the rule;
   applying the rule to determine attribute values for a plurality of detected events stored in a second table, the determination made by at least one processor, wherein:
      the plurality of detected events in the second table occurred after the rule update time such that the rule is applied only to the plurality of detected events occurring after the rule update time and not to any detected events occurring before the rule update time;
      the plurality of detected events are associated with event identifiers; and
      each of the plurality of detected events is associated with a plurality of attribute values, the attribute values of each detected event defining a respective point in n-dimensional space;
   storing in a third table the determined attribute values and the event identifiers;
   identifying in the third table one or more event identifiers associated with one or more attribute values that satisfy the query; and
   displaying a set of query results to a user, wherein the set of query results include one or more event identifiers associated with detected events occurring after the rule update time and one or more event identifiers associated with a cached query result of at least one detected event occurring prior to the rule update time;
   correlating the target event and one or more similar detected events of the second table, the correlation based at least in part on a distance between the respective points defined by the respective attribute values of the target event and the one or more similar detected events of the second table, wherein the distance between the respective points defined by the respective attribute values of the target event and the one or more similar detected events of the second table are proximate to one another indicating that the target event is similar to the one or more similar detected events; and
   identifying a source of the target event as being the same as the source of the one or more similar detected events based on the correlation.

13. The method of claim 12, further comprising:
   determining whether the query is stored in a fourth table; and
   if the query is stored in the fourth table, determining a query identifier and a query update time associated with the query, the query identifier and the query update time stored in the fourth table.

14. The method of claim 12, further comprising:
   determining whether the query is stored in a fourth table; and
   if the query is not stored in the fourth table, assigning a query identifier to the query and storing the query and the query identifier in the fourth table.

15. The method of claim 12, further comprising updating the rule update time associated with the rule, the rule update time stored in the first table.

16. The method of claim 12, wherein the query is associated with a query identifier, and further comprising storing in a fifth table the identified event identifiers in association with the query identifier.

17. The method of claim 12, further comprising updating a query update time associated with the query, the query update time stored in a fourth table.

18. The method of claim 12, further comprising:
   retrieving from the second table one or more detected events associated with the identified event identifiers; and
   causing a graphical user interface to display the retrieved detected events.

19. The method of claim 12, wherein the query is part of a complex query, and further comprising parsing the complex query into individual queries.

20. The method of claim 12, wherein the plurality of attribute values associated with a detected event comprise:
   a first attribute value based on a source IP address;
   a second attribute value based on a destination IP address; and
   a third attribute value based on a time of detection.

21. The method of claim 12, wherein:
   a first axis of the n-dimensional space corresponds to source IP addresses of the plurality of detected events; and
   a second axis of the n-dimensional space corresponds to destination IP addresses of the plurality of detected events.

* * * * *